United States Patent
Makaran

(10) Patent No.: US 6,630,805 B2
(45) Date of Patent: Oct. 7, 2003

(54) ACTIVELY CONTROLLED REGENERATIVE SNUBBER FOR UNIPOLAR BRUSHLESS DC MOTORS

(75) Inventor: John Edward Makaran, London (CA)

(73) Assignee: Siemens VDO Automotive Inc., Mississauga (CA)

( * ) Notice: Subject to any disclaimer, the term of this patent is extended or adjusted under 35 U.S.C. 154(b) by 0 days.

(21) Appl. No.: 09/727,114

(22) Filed: Nov. 29, 2000

(65) Prior Publication Data

US 2001/0000293 A1 Apr. 19, 2001

Related U.S. Application Data

(63) Continuation of application No. 09/104,449, filed on Jun. 25, 1998, now Pat. No. 6,166,500.
(60) Provisional application No. 60/053,359, filed on Jul. 18, 1997.

(51) Int. Cl.[7] ................................................. H02P 7/06
(52) U.S. Cl. .................. 318/254; 318/138; 318/439; 363/56.12; 361/91.7
(58) Field of Search ................................. 318/800, 811, 318/138, 439, 254; 363/56.12; 361/91.7

(56) References Cited

U.S. PATENT DOCUMENTS

| | | | | |
|---|---|---|---|---|
| 4,334,254 A | * | 6/1982 | Baker et al. | 361/9 |
| 4,609,859 A | * | 9/1986 | Williams | 318/810 |
| 4,760,324 A | * | 7/1988 | Underhill | 323/282 |
| 5,055,762 A | * | 10/1991 | Disser et al. | 318/811 |
| 5,252,907 A | * | 10/1993 | Harris et al. | 323/285 |
| 5,260,607 A | * | 11/1993 | Kinbara | 307/253 |
| 5,313,548 A | * | 5/1994 | Arvidson et al. | 388/800 |
| 5,559,683 A | * | 9/1996 | Schoenwald | 363/21 |
| 5,636,114 A | * | 6/1997 | Bhagwat et al. | 363/56 |
| 5,828,559 A | * | 10/1998 | Chen | 363/56 |

* cited by examiner

Primary Examiner—Bentsu Ro
Assistant Examiner—Rina I. Duda
(74) Attorney, Agent, or Firm—Abelman, Frayne & Schwab

(57) ABSTRACT

An actively controlled regenerative snubber configuration for use in unipolar brushless direct current motors comprises a first inductor, a first switch and a capacitor, all of which are connected in series to a positive voltage supply and in parallel with a second inductor and a second switch. The regenerative snubber is used to maintain constant voltage across the switches to prevent braking of the motor through conduction of motor back EMF and to return excess energy stored in the motor phase coils to the positive voltage supply. The return of energy to the positive rail is done in a manner so as to minimize conducted electromagnetic interference at the power leads.

26 Claims, 25 Drawing Sheets

FIG. 10A

```
5 PHASE HALF WAVE CIRCUIT ANALYSIS

*       THIS CIRCUIT IS USED TO MODEL A 5 PH 1/2 WAVE PWM DRIVE
VBAT    1       0       DC      12V

VBEMF   1       2       DC      3V
VPULSE  15      0       PULSE(0 12V 0 150NS 150NS 22US 43US)
RPULSE  15      0       10K

SW1     10      0       15      0       SMOD1
.MODEL SMOD1    VSWITCH(RON=0.01 ROFF=10E+6     VON=1 VOFF=0.5)
*       COIL PARAMETERS
L1      2       6       65UH
R1      6       10      0.065

*       SNUBBER AND DRIVER TRANSISTOR PARAMETERS
CSNUB   11      0       1UF
D1      10      11      MUR415

SW2     12      1       100     0       SMOD2
.MODEL SMOD2    VSWITCH(RON=0.01 ROFF=10E+6     VON=1.5 VOFF=0.5)
LSW2    11      12      1UH

RPULP   100     1       10K

X1      50      40      1       0       100     LM339

RREF1   11      50      30K
RREF2   50      0       10K
VREF1   40      0       DC      6.00V

*       LIBRARIES INCLUDED

.LIB LINEAR.LIB
.LIB DIODE.LIB
.OPTIONS RELTOL=0.01
.TRAN 5US 0.5MS
.PROBE
.END
```

ACTIVELY CONTROLLED REGENERATIVE SNUBBER FOR UNIPOLAR BRUSHLESS DC MOTORS

CROSS-REFERENCE TO RELATED APPLICATIONS

This application is a continuation of U.S. Nonprovisional application Ser. No. 09/104,449, filed on Jun. 25, 1998, U.S. Pat. No. 6,166,500 which claims the benefit of the filing date of U.S. Provisional Application No. 60/053,359, filed on Jul. 18, 1997.

BACKGROUND OF THE INVENTION

1. Field of the Invention

This invention relates to the field of devices for the protection of power electronic devices from extreme voltage or current changes and, in particular, to snubbers which protect switching devices in unipolar brushless DC motors and also return energy stored in such snubbers to the motors protected.

2. Description of the Related Art

The use of turn on and turn off snubbers for the protection of power electronic devices is not new. Snubbers in general are devices which limit overvoltage or overcurrent transients over electronic switching devices during or after the action of switching current. Snubbers have been used to protect devices against rapid changes in voltage with respect to time (dv/dt), rapid changes in current with respect to time (di/dt) and transient voltages.

Although dissipative snubbers are very common, regenerative snubbers have been proposed to return energy stored in snubber elements back to the positive voltage supply, thereby increasing system efficiency. Regenerative snubbers may be comprised of passive or active components. Regenerative snubbers using transformers have been proposed. An actively controlled regenerative snubber configuration for use in unipolar configuration brushless direct current (DC) motors is disclosed herein. The regenerative snubber is used to maintain a constant voltage across the switching devices to prevent braking of the motor through conduction of motor back electromotive force (EMF), and to return excess energy stored in the motor phase coils to the positive voltage supply. The return of energy to the positive rail is done in a manner so as to minimize conducted electromagnetic interference at the power leads.

The most common snubber configuration is the Resistor-Capacitor-Diode (RCD) snubber. This snubber configuration appears in FIG. 1. The principle of operation of the RCD snubber follows. When switch S 2 is open, the current stored in L 4 is discharged into the snubber capacitor C 6 through diode D 8. When switch S 2 is closed again, the energy stored in C 6 discharges through the resistor R 10 back into the switch S 2. As a result, the energy stored in the coil 4 is transferred to the capacitor, C 6 and through the resistor R 10. The disadvantage of the RCD snubber is the dissipation of stored energy in the form of heat. If the switching frequency of the device to which the snubber is attached is high, the amount of energy converted to heat may be excessive.

When using the RCD snubber in the control circuit of a unipolar brushless DC motor, there arise some unique challenges particularly where low voltage, high current applications are concerned. (In a unipolar brushless DC motor the current in the windings flows in one direction through the coils from a DC source to ground.) In such a system, the snubber capacitor and resistor are shared by the phases feeding the snubber network through a series of diodes. The typical RCD snubber configuration for unipolar brushless DC motors is illustrated in FIG. 2. The snubber resistor 12 is connected to the positive voltage rail 14 so that some of the energy stored in the snubber capacitor may be returned to the positive voltage rail.

In the low side drive configuration shown in FIG. 2, each particular phase has its own diode to feed the snubber network. The diodes are present to prevent the shorting out of the motor phase coils. (The low side drive configuration is called by this name since the switch S 15 is connected to the low side or bottom side of the load. The low side drive configuration is also called a boost converter since $V_A$ 13 is always greater than $V_S$ 17 when the switch S 15 is turned on and off rapidly.) Such a snubber has been proposed by Elliot et al., U.S. Pat. No. 4,678,973. The performance of the snubber resistor 12 is not optimized for all motor speeds. Therefore, at high motor speeds when there is no chopping, the snubber resistor acts as a brake. Consequently, the efficiency of the motor is adversely affected at high motor speeds. For a 600 watt (W) application, there would be an increase in losses and, therefore, the, snubber circuit would dissipate more power.

An RCD snubber network is only required for low side drive, or boost converter type motor drives. In a high side drive, or buck converter motor drive, the RCD snubber may be replaced by diodes connected to the positive rail. This configuration is illustrated in FIG. 3. This configuration is so named since the switch S1 19 is connected to the high side or top side of the load. It is also called a "buck" converter or a "down" converter as $V_A$ 21 is never greater than $V_S$ 23. In some automotive systems, however, there is a requirement for reverse voltage protection.

In the high side drive configuration illustrated in FIG. 3, if the switching devices used are MOSFETs (Metal Oxide Semiconductor Field Effect Transistors) which are best suited for high power, low voltage operation (low on resistance), the reverse protection devices must be included due to the source to drain diodes inherent to the MOSFETs. These diodes will become forward biased during a reverse polarity condition. The additional reverse protection devices have a voltage drop associated with them, causing a loss in motor efficiency.

The low side drive configuration, on the other hand, requires reverse voltage protection devices. However, in this configuration, only two voltage drops are dealt with, as opposed to three in the case of the high side drive, or buck converter, configuration.

In the boost, or low side drive configuration, passive means of energy recovery through the use of catch windings has been proposed by Finney et al., *The RCD Snubber Revisited*. IEEE Industrial Applications Society Conference Proceedings, Toronto, Canada, 1993, pp. 1267–1273. The disadvantage of this method is the size of the transformers needed to return the energy stored in the snubber capacitor back to the positive voltage supply. The transformer may be another phase coil, or part of the same winding as the phase coil. There is a cost penalty associated with the manufacture of bifilar windings (two windings per phase), however, in addition to the difficulty in winding them.

Active snubber configurations have been proposed by Zach et al., *New Lossless* Turn-On and Turn-Off (Snubber) Networks for Inventors, Including Circuits for Blocking Voltage Limitation, IEEE Transactions on Power Electronics, April 1986, pp. 65–75, and by Elasser and Torrey, *Soft Switching Active Snubbers for DC/DC Converters*, IEEE Applied Power Electronics Conference, Dallas, Texas, 1995, pp.483–489. These snubber configurations use a transistor and an inductor to replace the snubber resistor. The purpose of the transistor and inductor is to discharge the snubber capacitor to the positive voltage rail, recycling the capacitor energy and thereby increasing system efficiency.

In unipolar brushless DC motors, the active snubber configuration may also be used to increase motor efficiency at all speeds. The added challenges with motors of this type involve dealing with motor back electromotive force (EMF), and the return of the capacitor energy to the positive rail in such a manner as to minimize conducted radio frequency noise emissions.

SUMMARY OF THE INVENTION

The circuit for the active snubber configuration is shown in FIG. 4. Inductor L is connected to the positive voltage supply 20, and the top of switch S1 22 is used to switch the windings at a frequency $f_c$. Coil L may be modeled as a resistor, R1 24, in series with an inductor L1 18. As a particular phase is switched when the value of the back EMF in the coil is at a maximum, the back EMF many be modeled as a DC voltage source during this time. Back EMF voltage E 26 is in opposition to the battery voltage +V 20. For any given motor speed, the motor back EMF E, is given by:

$$E = k_e \omega$$

Where:
$k_e$=the motor electrical constant (V rads$^{-1}$s$^{-1}$)
$\omega$=the motor speed (rads s$^{-1}$)

The bottom of L1 18 is connected to the snubber circuit comprised of L2 28, S2 30, and C 32, through diode D1 34. When L1 18 is turned on, a current $i_1$ (t) flows through the phase coil, L1, though switch S1 22, and to ground. There will be a buildup of current in the phase coil L1. When the phase coil L1 is switched off, there will be a voltage appearing at the bottom of the coil as illustrated in FIG. 5. The magnitude of this voltage is equal to:

$$V_{S1} = +V + L\frac{di_1}{dt}(V) \quad \text{(by Lenz's law)}$$

If the voltage across S1 22 is great enough, S1 22 will avalanche (break down and conduct the short circuit current of the device), and could be permanently damaged. Consequently, it is desired to limit the voltage across S1 to a safe level as specified in the device literature. It is also desired to minimize the switching losses in the device. As switching losses are the product of the voltage and current during turn off and turn on, the magnitude of losses will be proportional to the voltage across S1, during turn on and turn off. To maximize motor efficiency, the motor back EMF should not be conducted through the snubber network, for the snubber will act as a brake. As this is a common snubber to all phase coils, the snubber capacitor voltage must be maintained slightly higher in magnitude above the back EMF voltage for a particular motor speed.

When S1 22 is turned off, the phase coil begins to discharge through the snubber diode for that particular phase. Once the capacitor voltage reaches a certain value, switch S2 30 is turned on, and the capacitor is discharged through inductor L2 28. The purpose of L2 28 is twofold. L2 is included to slow the discharge of capacitor C 32, and to ensure that C 32 is discharged in a sinusoidal fashion for harmonic minimization of the discharge current This is done to minimize high frequency conducted and radiated noise emissions. Once the voltage across C 32 falls to below the preset level dependent on the motor speed, S2 30 is once again shut off.

The motor back EMF is linear with respect to motor speed. Therefore, the desired capacitor voltage will also be linear with respect to motor speed, being slightly greater than the magnitude of the motor back EMF. This is illustrated in FIG. 6. The motor for which the invention is used is a unipolar motor with the back EMF superimposed on top of the supply voltage. Consequently, the minimum desired capacitor voltage will be the supply voltage. Therefore, the desired capacitor voltage also depends on the applied terminal voltage in addition to the motor speed.

If motor input power is very high and the energy dumped into a common snubber would cause excessive temperature rise and reliability problems in the active snubber components, a separate snubber could be used for each motor phase. The general arrangement in such a case is shown in FIG. 4*a*.

In general, the invention comprises an actively controlled regenerative snubber configuration for use in a unipolar brushless direct current motor comprising a snubber circuit, the snubber circuit comprising a first inductor, a first switch, and a capacitor, the first inductor, the first switch and the capacitor being connected in series to a positive voltage supply of the motor.

In an alternative embodiment, the invention comprises an actively controlled regenerative snubber configuration for use in a unipolar brushless direct current motor comprising at least one snubber circuit, each of the at least one snubber circuit comprising a first inductor, a first switch, and a capacitor, the first inductor, the first switch and the capacitor being connected in series to a positive voltage supply of the motor.

The invention also comprises a method for protecting a unipolar brushless direct current motor and returning energy to the motor by employing an actively controlled regenerative snubber configuration comprising a snubber circuit, the snubber circuit comprising a first inductor, a first switch, and a capacitor, the first inductor, the first switch, and the capacitor being connected in series to a positive voltage supply of the motor, the snubber configuration further comprising a set of a second inductor and a second switch for each phase of at least one phase of current powering the motor, each set of the second inductor and the second switch being connected to the positive voltage supply in parallel with the first inductor, the first switch, and the capacitor, the method comprising the steps of: 1) closing the second switch corresponding to a phase of the at least one phase of current, thereby allowing the phase to flow through the second inductor corresponding to the phase and increase within the second inductor; 2) opening the second switch when voltage across the second switch has reached a first predetermined value, thereby allowing the second inductor to discharge into the capacitor; 3) closing the first switch once voltage across the capacitor has reached a second predetermined value, thereby allowing the capacitor to discharge through the first inductor; 4) opening the first switch once voltage across the capacitor falls to a value below a third predetermined value; and 5) returning to step 1) to perform it again.

The invention also comprises a method for protecting a unipolar brushless direct current motor and returning energy to the motor by employing an actively controlled regenerative snubber configuration comprising at least one snubber circuit, each snubber circuit of the at least one snubber circuit comprising a first inductor, a first switch, and a capacitor, each snubber circuit corresponding to one phase of at least one phase of current powering the motor, each snubber circuit being connected in series to a positive voltage supply of the motor, the snubber configuration further comprising a set of a second inductor and a second switch for each phase of the at least one phase of current powering the motor, each set of the second inductor and the second switch being connected to the positive voltage supply in parallel with each snubber circuit, the method comprising die steps of: 1) closing the second switch corresponding to a phase of the at least one phase of current, thereby allowing the phase to flow through the second inductor corresponding to the phase and increase within the second inductor; 2) opening the second switch corresponding to the phase when voltage across the second switch corresponding to the phase has reached a first predetermined value, thereby allowing the second inductor corresponding to the phase to discharge into the capacitor corresponding to the phase; 3) closing the first switch corresponding to the phase once voltage across the capacitor corresponding to the phase has reached a second predetermined value, thereby allowing the capacitor corresponding to the phase to discharge through the first inductor corresponding to said phase; 4) opening the first switch corresponding to the phase once voltage across the capacitor corresponding to the phase falls to a value below a third predetermined value; and 5) returning to step 1) to perform it again.

BRIEF DESCRIPTION OF THE DRAWINGS

FIG. 10a is a Simulated Program with Integrated Circuit Emphasis (SPICE) listing for a simulation of the operation of the invention.

FIGS. 11–13 are SPICE plots of the simulation of the operation of the invention, the SPICE listing for which is shown in FIG. 10a.

in FIG. 29.

DESCRIPTION OF THE PREFERRED EMBODIMENT THEORETICAL MODEL OF OPERATION OF INVENTION

DURING TURN ON OF $S_1$ (MODE I)

Figure 1:
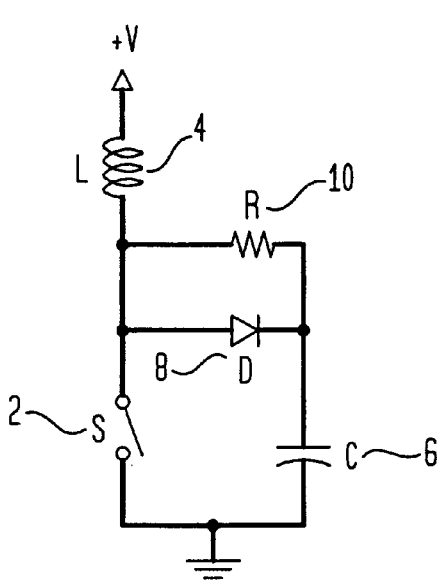
FIG. 1 is a schematic diagram of the Resistor-Capacitor-Diode (RCD) snubber.
Figure 2:
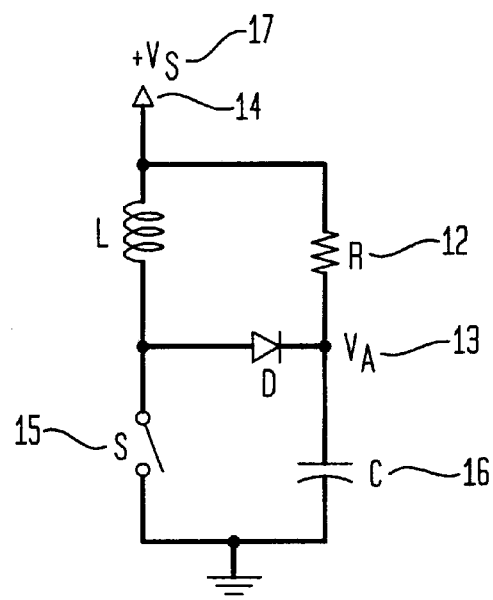
FIG. 2 is a schematic diagram of the RCD snubber for unipolar brushless motors.
Figure 3:
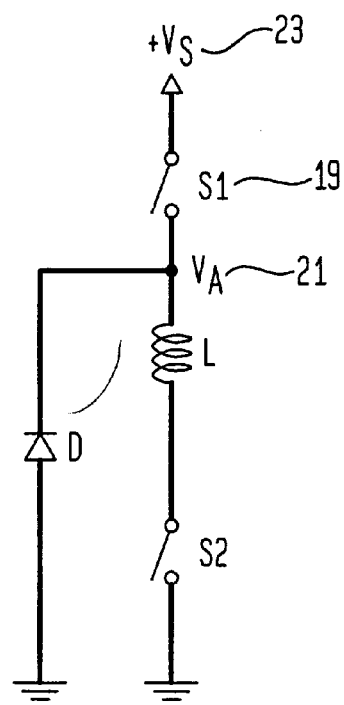
FIG. 3 is a schematic diagram of a snubberless high side drive configuration for brushless motors.
Figure 4:
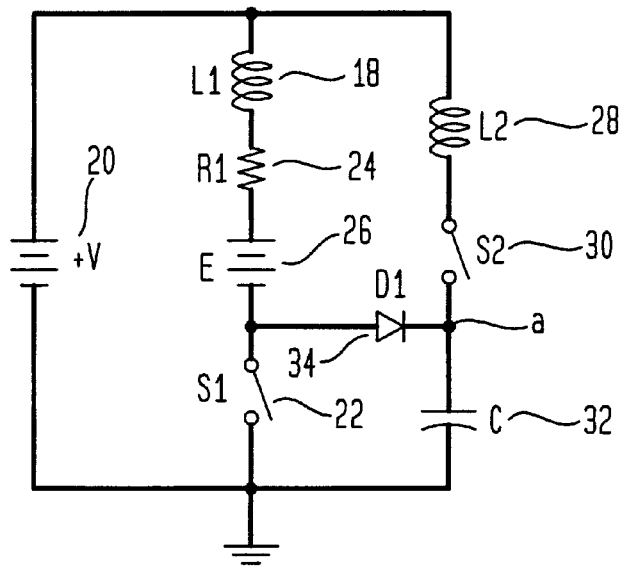
FIG. 4 is a schematic diagram of a first embodiment of the invention where a common snubber is used for all motor phases.
Figure 4A:
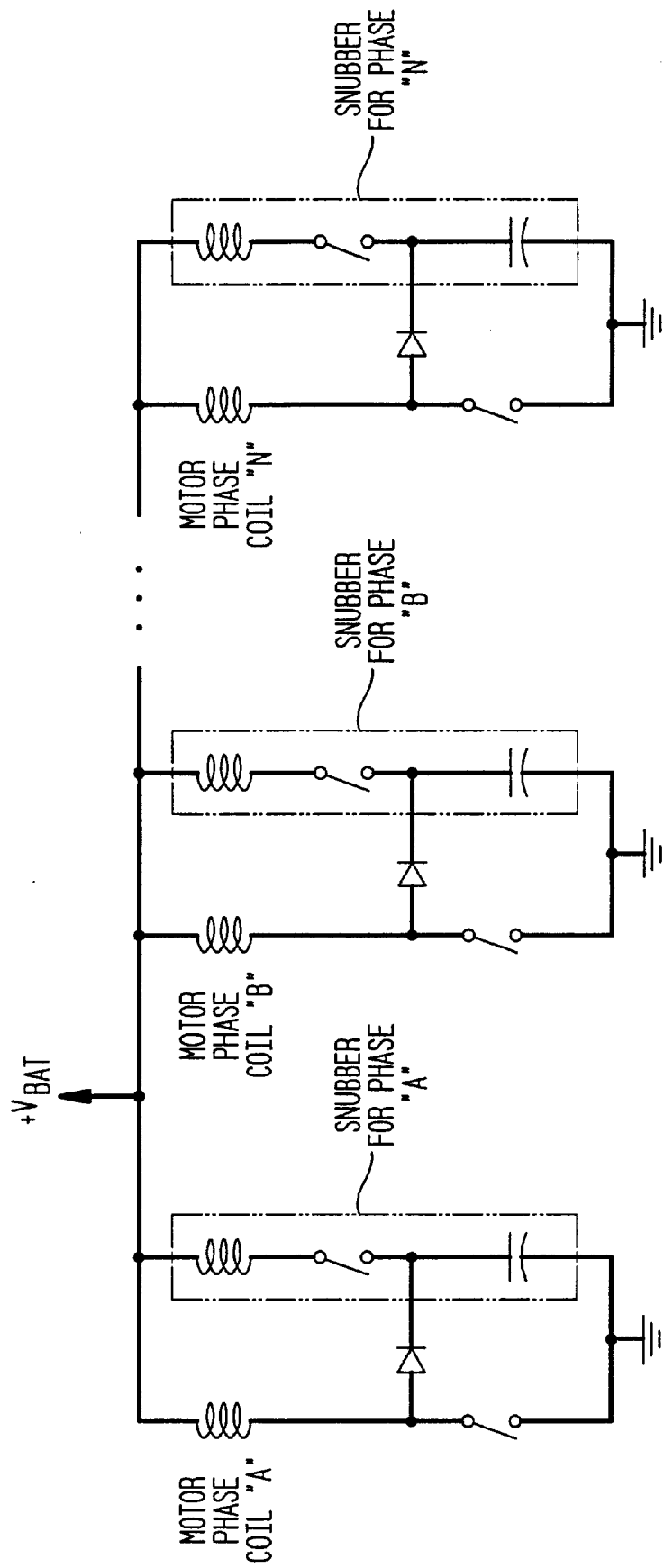
FIG. 4a is a schematic diagram of a second embodiment of the invention where a separate snubber is used for each motor phase.
Figure 5:
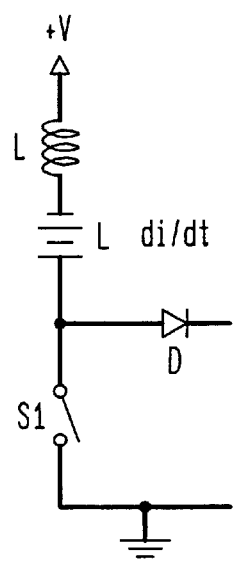
FIG. 5 is a schematic diagram of a portion of the embodiment of the invention shown in FIG. 4.
Figure 6:
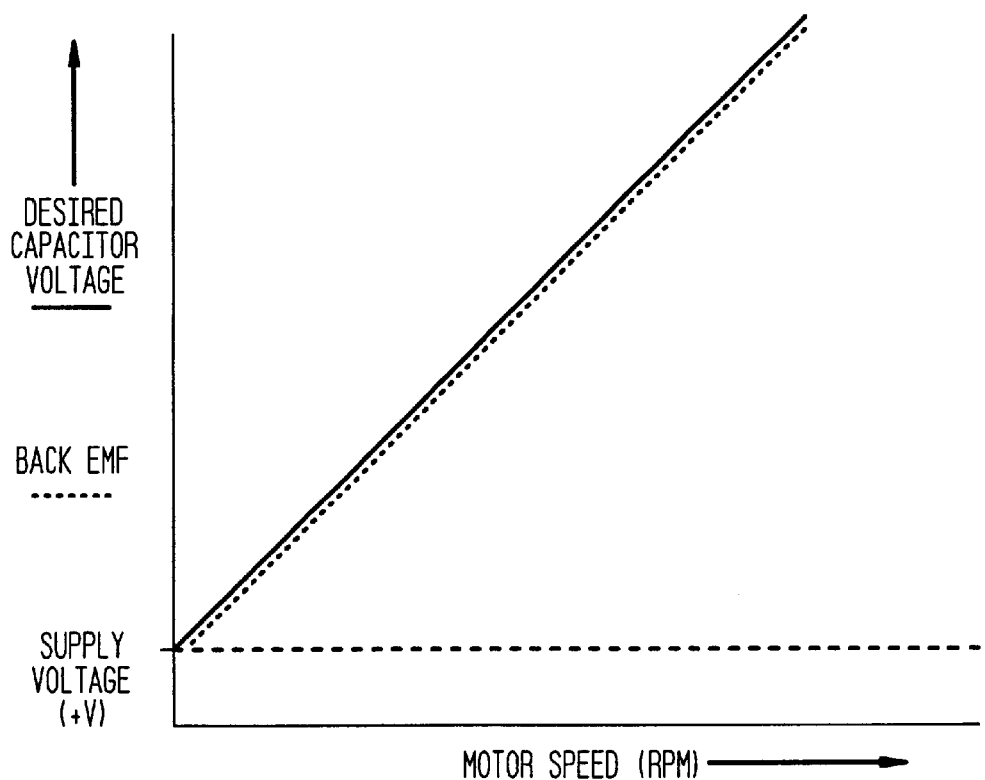
FIG. 6 is a graph plotting desired capacitor voltage and motor back EMF versus motor speed.
Figure 7:
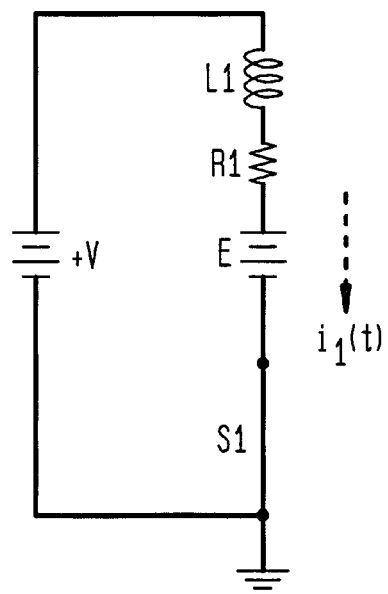
FIG. 7 is a schematic diagram showing the theoretical operation of the invention during the time switch $S_1$ is closed.

Referring to FIG. 7, the cycle is initially started with switch $S_1$ being closed to energize the motor phase coil. If we assume that the motor phase coil has been conducting for some period of time at the onset of analysis, the phase coil will have a current flowing through it. The snubber capacitor will be precharged to a known voltage. The applied voltage is equal to the supply voltage V minus the back EMF voltage, E.

Our assumptions thus are:

$$V_c(0^+) = V_o$$

$$i_{L1}(0+) = I_o = i_i(0^+)$$

$$V = +V - E$$

By Kirchoff's Voltage Law (KVL):

$$V - L_1 \frac{di_1}{dt} - R_1 i_i = O$$

Therefore $$\therefore \frac{di_1}{dt} = \frac{-V + R_1 i_1}{-L_1} = \frac{V - R_1 i_1}{L_1} = \frac{-R_1}{L_1}\left(i_1 - \frac{V}{R_1}\right)$$

$$\left(\frac{di_1}{dt}\right)dt = \frac{-R_1}{L_1}\left(i_1 - \frac{V}{R_1}\right)dt$$

$$di = \frac{-R_1}{L_1}\left(i_1 - \frac{V}{R_1}\right)dt$$

$$\int_{i_o}^{i_1(t)} \frac{dx}{[x-(V/R_1)]} = \frac{-R_1}{L_1} \int_o^t dy$$

Since ln a−ln b=ln a/b $$\ln \frac{[i_1(t)-V/R_1]}{[I_o-V/R_1]} = \frac{-R_1 t}{L_1}$$

$$\therefore i_1(t) = \frac{V}{R_1} + \left(I_o - \frac{V}{R_1}\right) e^{-(R_1/L_1)t}$$

DURING TURN OFF OF S. (MODE II)

Figure 8:
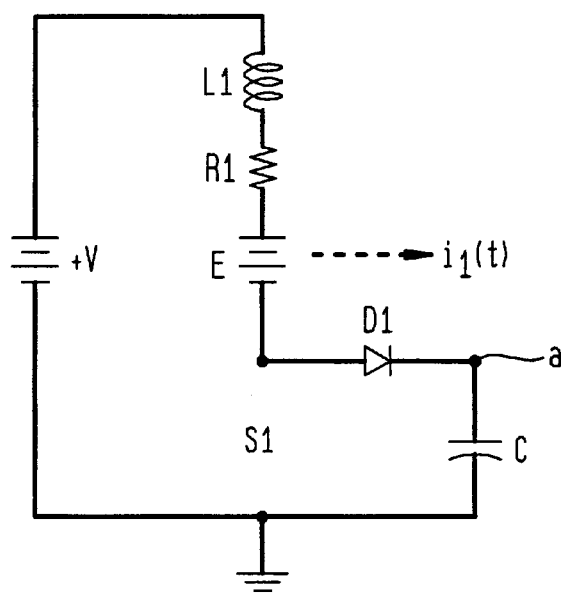
FIG. 8 is a schematic diagram showing the theoretical operation of the invention during the time switch $S_1$ is opened.

Referring to FIG. 8, Mode I ends when $S_1$ is opened. At this point in time, the phase coil is carrying an initial current $I_o'$. The phase coil will discharge into the snubber capacitor C through snubber diode $D_1$. The voltage in the snubber capacitor will start to rise. To minimize high frequency harmonics, it is desired to have a gradual voltage rise across switch $S_1$. The rate of rise may be controlled by capacitor C. By KVL, $$V - V_o - L_1 \frac{di_1}{dt} - R_1 i_1 \frac{-1}{C} \int_o^t i_1 \, dt = 0$$

Differentiating, we obtain:

$$-L \frac{d^2 i_1}{dt^2} - R_1 \frac{di_1}{dt} - \frac{1}{C} i_1 = 0$$

Dividing through by $-L_1$:

$$\frac{d^2 i}{dt^2} + \frac{R_1}{L_1} \frac{di_1}{dt} + \frac{1}{L_1 C} i_1 = 0$$

The characteristic equation for this equation is of the form:

$$s^2 + \frac{R_1}{L_1} s + \frac{1}{L_1 C} = 0$$

The roots of this characteristic equation are equal to:

$$S_{1,2} = \frac{\frac{-R_1}{L_1} + / - \sqrt{-\left(\frac{R_1}{L_1}\right)^2 - \frac{4}{L_1 C}}}{2}$$

$$S_{1,2} = \frac{-R_1}{2L_1} + / - \sqrt{-\left(\frac{R_1}{2L_1}\right)^2 - \frac{1}{L_1 C}}$$

The roots are of the form:

$$S_{1,2} = -\alpha +/- \sqrt{\alpha^2 - \omega_o^2}$$

where:
  $\alpha$=the neper frequency (rads s$^{-1}$)
  $\omega_o$=the natural frequency (rads s$^{-1}$)
If we are to assume oscillatory behavior on turn off, $$\alpha^2 < \omega_o^2$$

As a result, the solution for $i_1(t)$ is of the form:

$$i_1(t) = A_1 e^{-\alpha t} \cos \omega_o t + A_2 e^{-\alpha t} \sin \omega_o t (A)$$

By the product rule (fg)'=f'g+g'f $$\frac{di_1}{dt} = -A_1 \alpha e^{-\alpha t} \cos \omega_o t - \omega_o A_1 e^{-\alpha t} \sin \omega_o t -$$
$$A_2 \alpha e^{-\alpha t} \sin \omega_o t + \omega_o A_2 \alpha e^{-\alpha t} \cos \omega_o t (A/s)$$

Now, solve for $A_1$, and $A_2$ using initial conditions at t=0
$i_1(0+)=I_o$ $$\frac{di_1}{dt} = \frac{V_o - V - R_1 I_o}{L_1}$$

$$\therefore A_1 = I_o$$

$$\therefore \frac{V_o - V - R_1 I_o}{L_1} = -I_o \alpha + \omega_o A_2$$

$$\therefore A_2 = \frac{V_o - V - R_1 I_o}{\omega_o L_1} + \frac{I_o \alpha}{\omega_o}$$

$$\therefore i_1(t) = I_o e^{-\alpha t} \cos \omega_o t + \left(\frac{V_o - V - R_1 I_o}{\omega_o L_1}\right) + \frac{I_o \alpha}{\omega_o} e^{-\alpha t} \sin \omega_o t (A)$$

Therefore, the capacitor voltage at this period of time is equal to:

$$V_c(t) = V_o(0^+) + \frac{1}{C} \int_o^t i_1 \, dt = 0$$

DURING TURN ON OF $S_2$ (MODE III)

Figure 9:
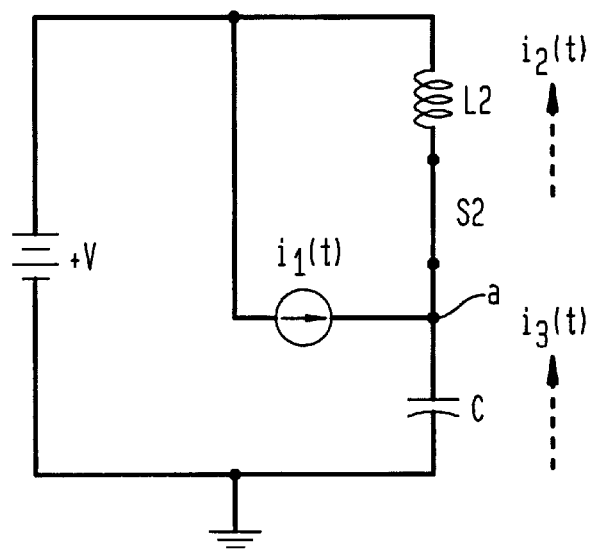
FIG. 9 is a schematic diagram showing the theoretical operation of the invention during the time switch $S_2$ is closed.

Referring to FIG. 9, when the voltage at the terminals of the snubber capacitor exceeds a certain value, $S_2$ will be turned on. We assume that the capacitor voltage, at the time $S_2$ starts to conduct, is greater than the supply voltage. The time at which $S_2$ starts to conduct is designated as $t_1$. For simplicity, we shall assume time $t_1$ to equal 0.
KCL at node a:

$$I_2(t) = I_1(t) + I_3(t) \text{ (A)}$$

It is evident that there is a contribution from the switch current from the coil $L_1$ and the capacitor C.
Assumptions at time $t_1$:

$$V_o(0+) = V_t$$

$$\frac{d^2 i}{dt^2} = \frac{Vt - + V}{L_2}$$

$i_3(0^+) = Io'$
$i_1(0^+) = Io'$
$i_1$ (t) may be represented as a current source.
To find the transient portion of the current in switch $S_2$, neglect the contribution of $i_1$ (t) momentarily.
By KVL:

$$+V + L_2 \frac{di_2}{dt} + \frac{1}{C} \int_o^t i_2 \, dt = 0$$

Differentiating:

$$L_2 \frac{d^2 i_2}{dt^2} + \frac{1}{C} i_2 dt = 0$$

-continued $$\frac{d^2 i_2}{dt^2} + \frac{1}{L_2 C} i_2 dt = O$$

This is an equation of the form:

$$s^2 + \frac{1}{L_2 C} = 0$$

the roots of this equation $s_{1,2}$ are equal to:

$$s_{1,2} = +/- \sqrt{\frac{1}{L_2 C}}$$

The general form of this solution is:

$i_2(t) = A_1 \cos \omega_o t + A_2 \sin \omega_o t$ $di_2/dt = -\omega_o A_1 \sin \omega_o t + \omega_o A_2 \cos \omega_o t$ Initial conditions at time $t_1$ when $S_2$ is closed:

$$i_2(0^+) = 0, \quad \frac{di_2}{dt}(0^+) = \frac{V_1 - +V}{\omega_o L_2}$$

$$\therefore i_2(t) = \frac{V_1 - +V}{\omega_o L_2} \sin \omega_o t$$

As long as $S_2$ conducts, the expression for the current through $S_2$ is equal to: $i_1$ (t)–$i_2$ (t). As soon as $S_2$ stops conducting, the current through $S_2$ will fall to zero. The corresponding capacitor voltage $V_c(t)$ during the time $S_2$ conducts, is equal to:

$$V_c(t) = V_t(0^+) + L_2 \frac{di_2}{dt}$$

$$\therefore V_c(t) = V_t(0^+) + [V_t(0^+) - +V] \cos \omega_o t$$

DURING TURN OFF OF $S_2$ (MODE IV)

Figure 10:
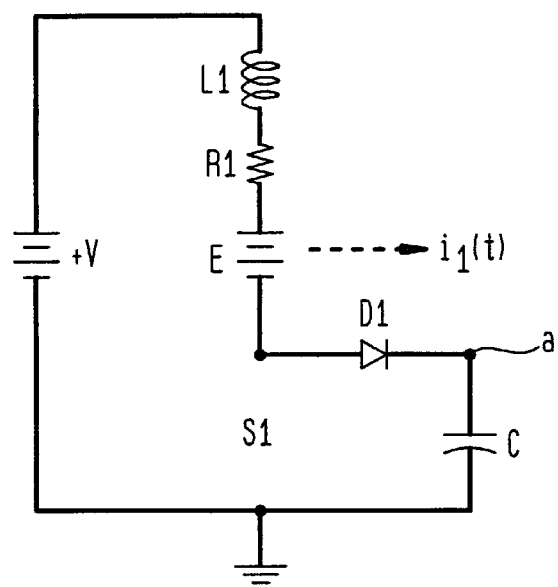
FIG. 10 is a schematic diagram showing the theoretical operation of the invention during the time switch $S_2$ is opened.

Referring to FIG. 10, when the capacitor voltage falls to the threshold level at the speed of interest due to the closing of $S_2$, switch $S_2$ will cease to conduct. As a result, the capacitor voltage will once again rise due to the discharge of $L_1$. The capacitor voltage and current once again reverts to the behavior exhibited during mode II when $S_1$ has been initially turned off. Consequently, the same equations for capacitor voltage and current apply.

SIMULATION OF OPERATION OF INVENTION AND RESULTS

For simulation purposes, the following component values were used:

$L_1$=65 μH $R_1$=65 mΩ

C=1 μF $L_2$=1 μH $f_c$=23.4 KHz

Duty Cycle of Phase Chopping 50%

To minimize computing time and possible convergence problems, switches $S_1$ and $S_2$ were modeled as ideal switches. Only one phase was modeled. The SPICE listing may be found in FIG. 10a. The SPICE plots appear in FIGS. 11–13.

Figure 11:
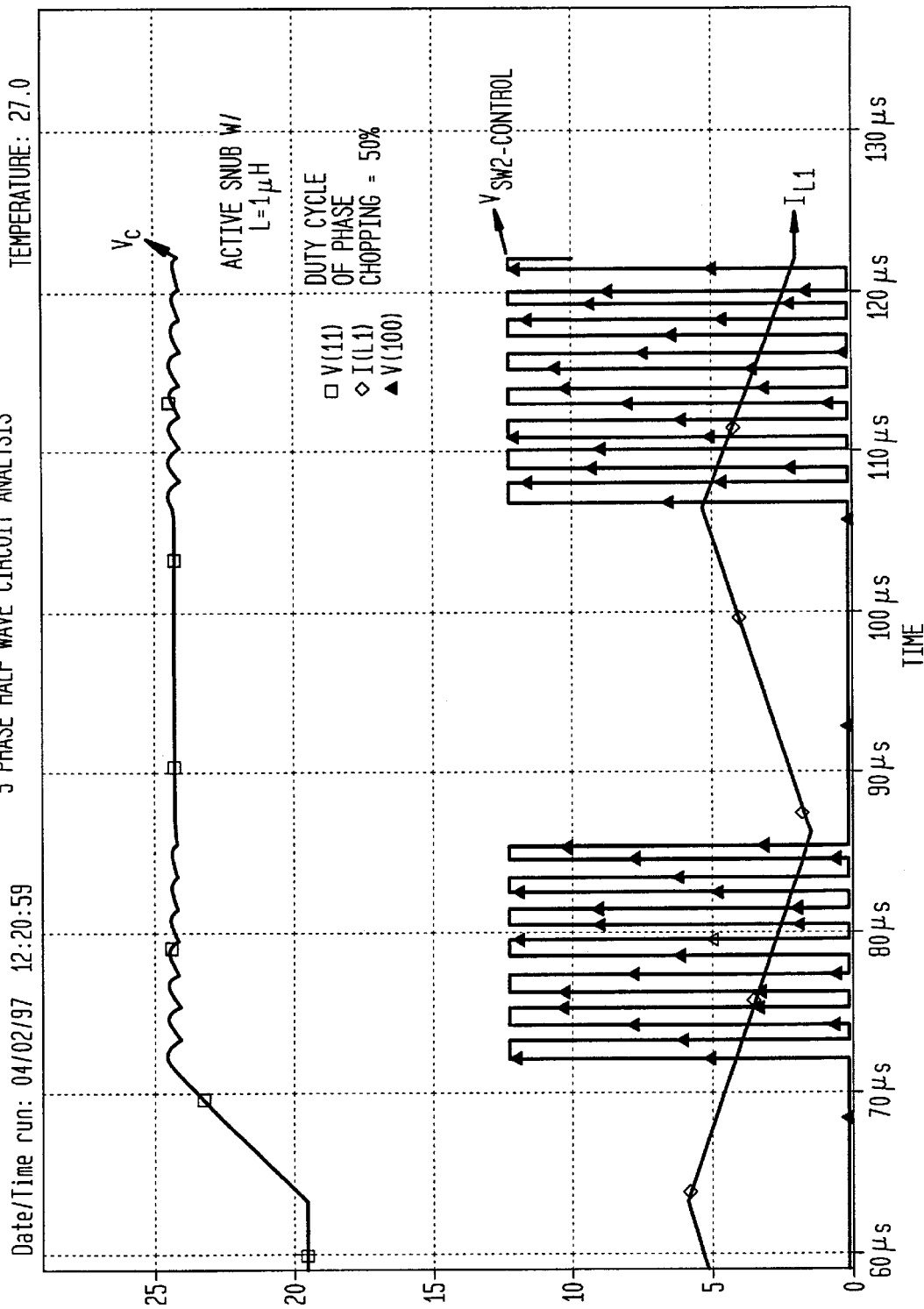

From FIG. 11, it may be seen that the current in the phase coil increases exponentially when $S_1$ is closed. When $S_1$ is opened, the phase coil discharges into the snubber network causing the capacitor voltage to rise in a sinusoidal manner as soon as the switch voltage exceeds the snubber voltage.

Figure 12:
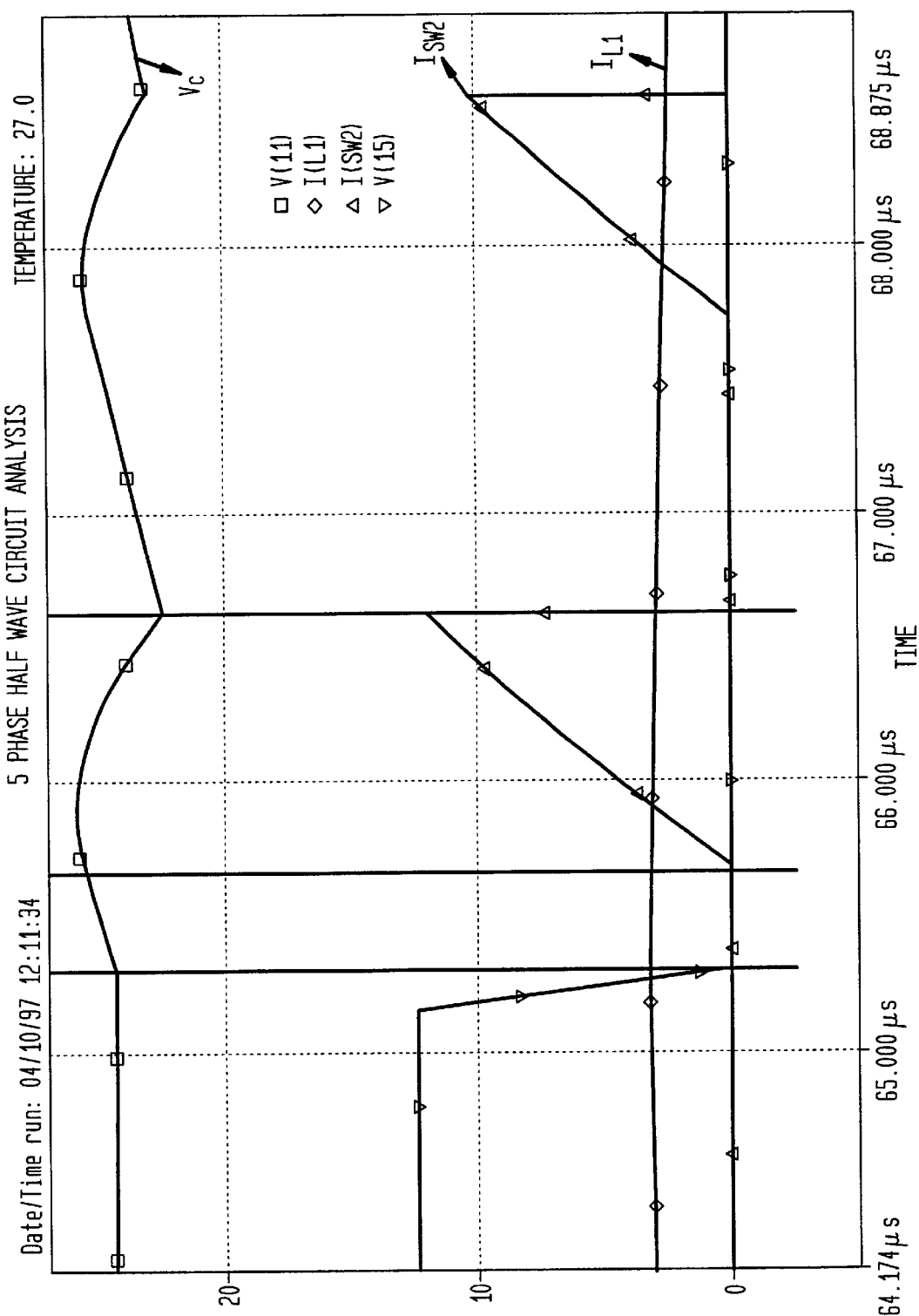
Figure 13:
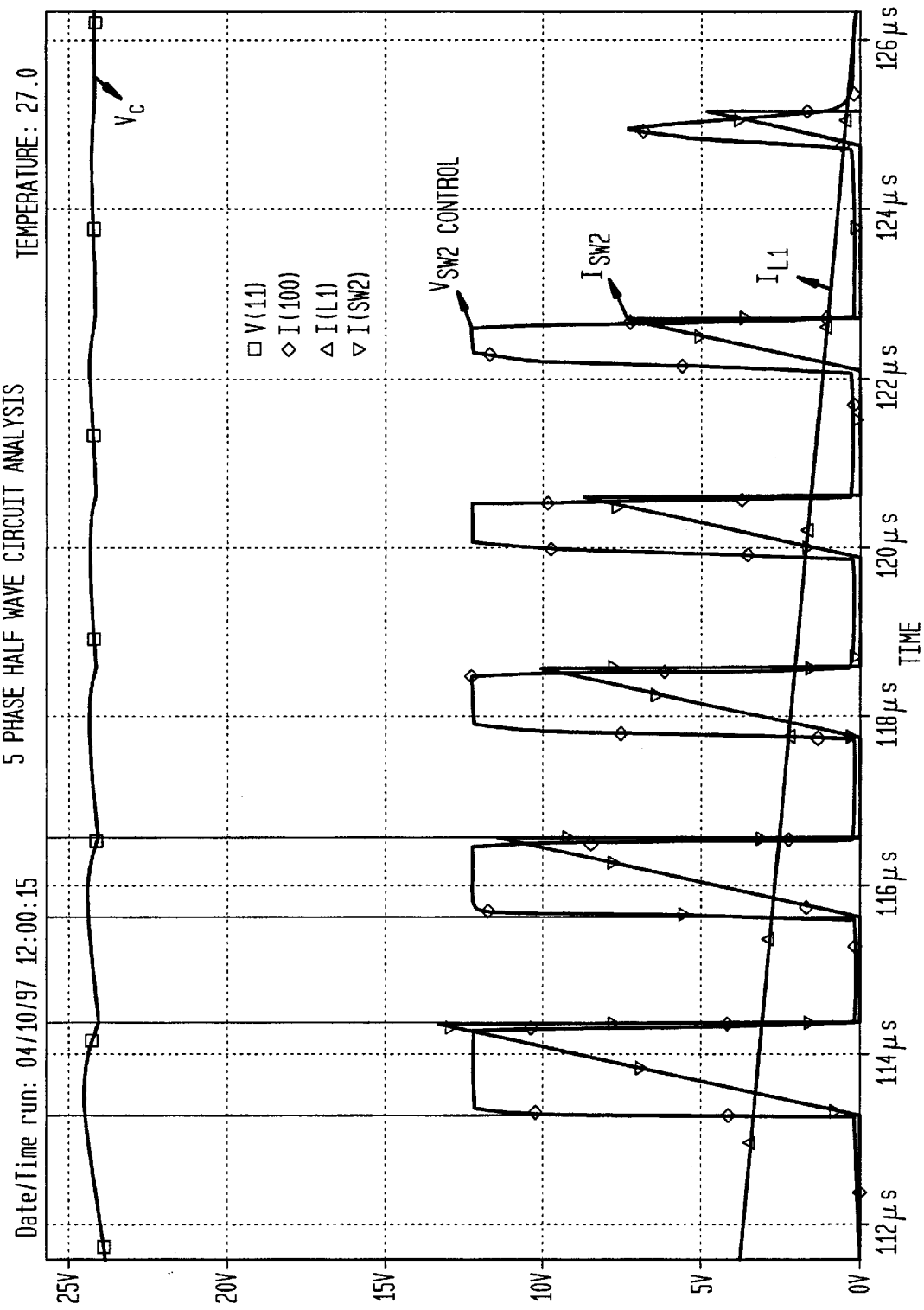

Once the snubber capacitor voltage rises to the desired level, $S_2$ begins to conduct. The opening of $S_1$ and subsequent closing of $S_2$ is illustrated in FIG. 12. When $S_2$ starts to conduct, the voltage across the snubber capacitor falls sinusoidally until the snubber capacitor voltage falls to the desired level, at which time $S_2$ turns off. The current in $S_2$ rises sinusoidally until $S_2$ is shut off. The current in $S_2$ then falls. During the time $S_2$ conducts, the phase coil behaves as an ideal current source as illustrated in FIG. 13.

Consequently, it may be shown the behavior of the circuit, as modeled using theoretical equations, corresponds to the expected simulated behavior using ideal components.

From the simulation, it may be shown that if the desired snubber capacitor voltage is too low, the phase coil will be depleted of current during the off-cycle. This will result in poor machine efficiency, torque ripple, and increased electromagnetic interference (EMI) emissions due to discontinuities in motor current.

There are two sets of harmonics generated by this circuit. The first set of harmonics will come from the interaction between the phase coil and the snubber capacitor during the charging of the snubber capacitor. The second set of harmonics will come from the closing of $S_2$. As the waveforms comprising the rise and fall in the capacitor voltage are primarily sinusoidal, one would expect the number of harmonics generated to be very low. The magnitude of the harmonics, however, at the fundamental frequency will be high. Consequently, the harmonics will be easy to filter by using capacitors placed across the supply voltage tuned to the fundamental frequencies.

EXPERIMENTAL RESULTS FROM TESTS OF PROTOTYPES OF THE INVENTION

$S_2$ ACTIVE SWITCH CONTROL

Figure 14:
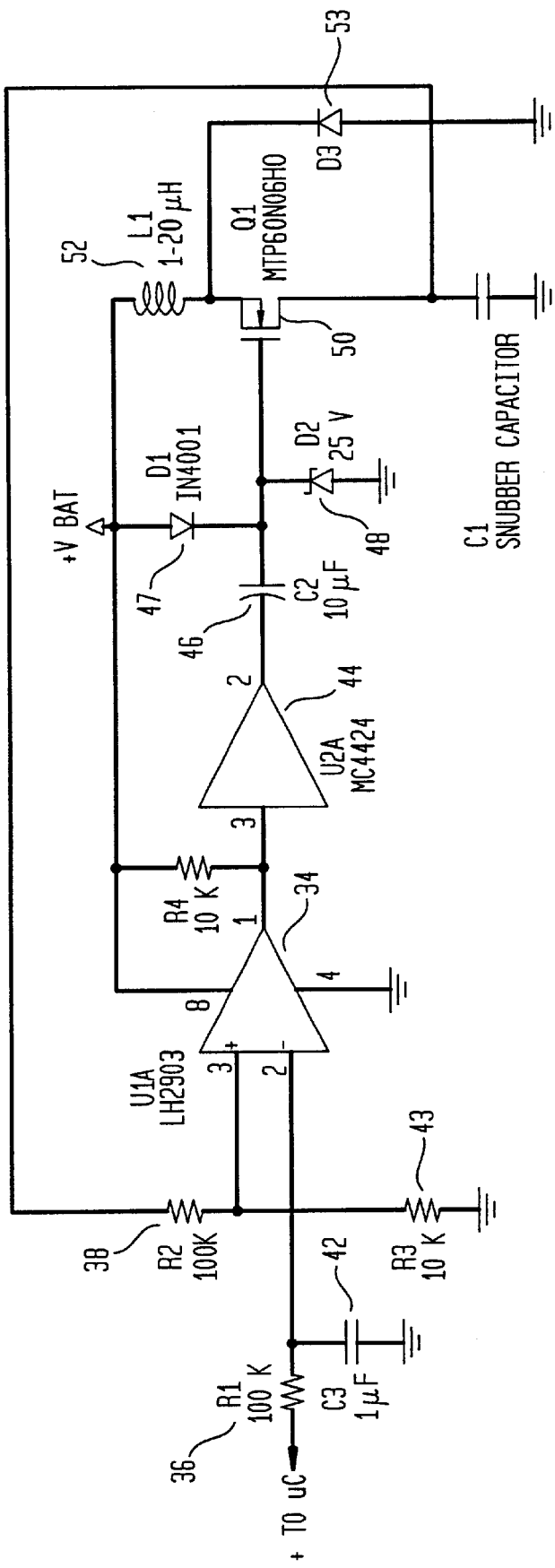
FIG. 14 is a schematic diagram of a configuration of the active snubbing circuit.
Figure 15:
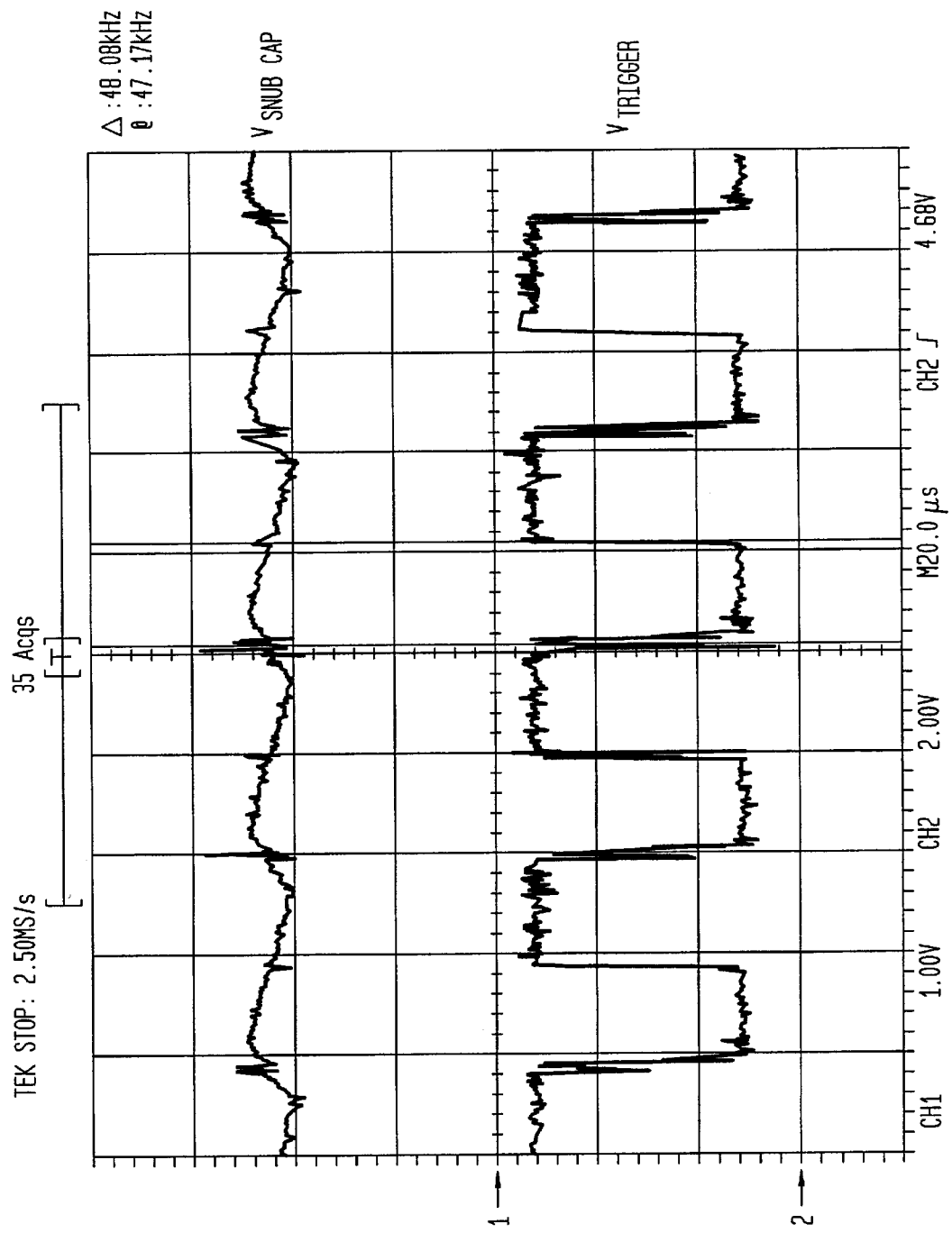
FIG. 15 is a plot of the output of the triggering circuit used to control the active snubbing circuit shown in FIG. 14.
Figure 16:
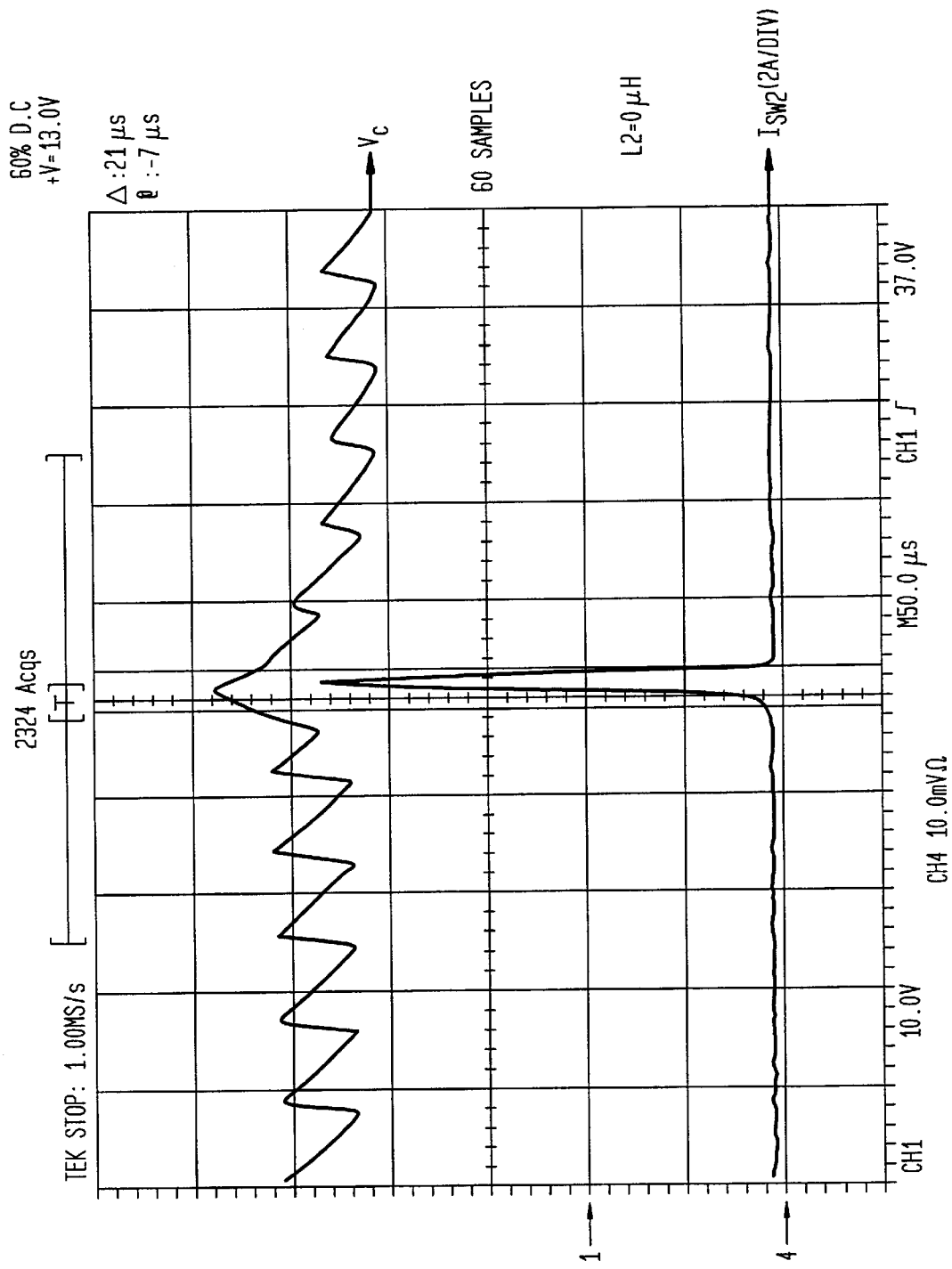
FIGS. 16 to 19 are plots of the current through a Zener diode once the threshold voltage is exceeded, the Zener diode being used to simulate switch $S_2$.
Figure 17:
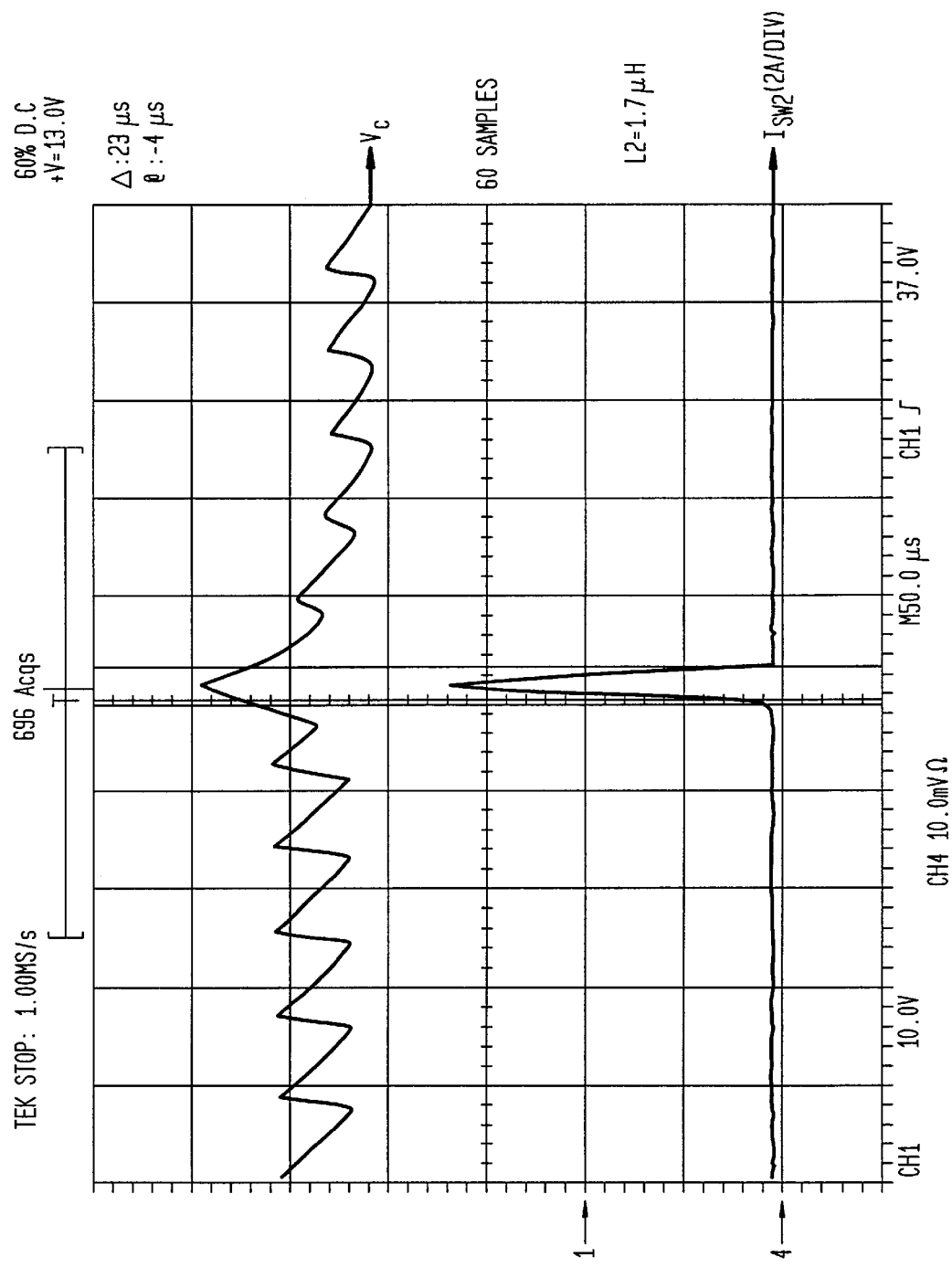
Figure 18:
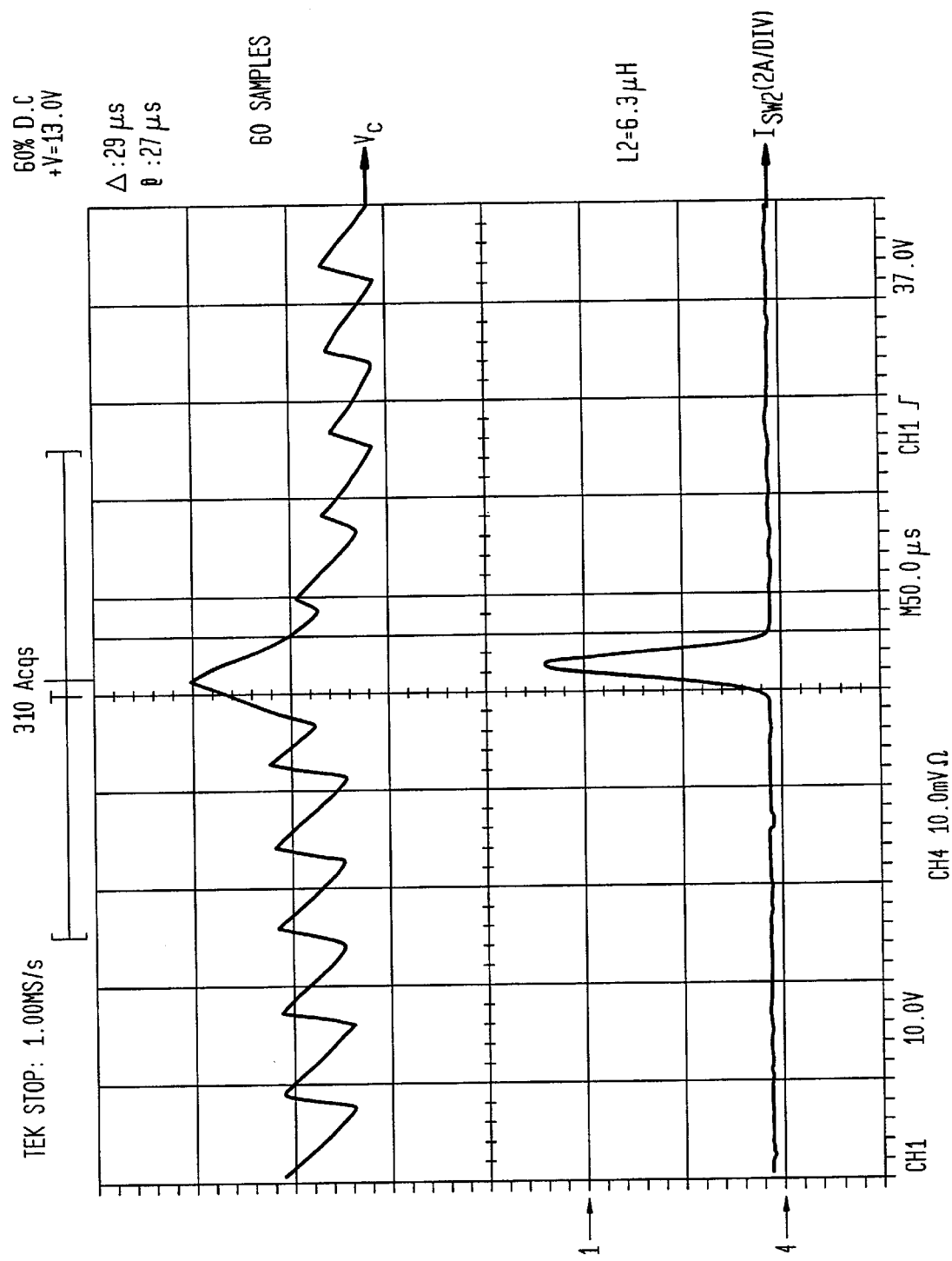
Figure 19:
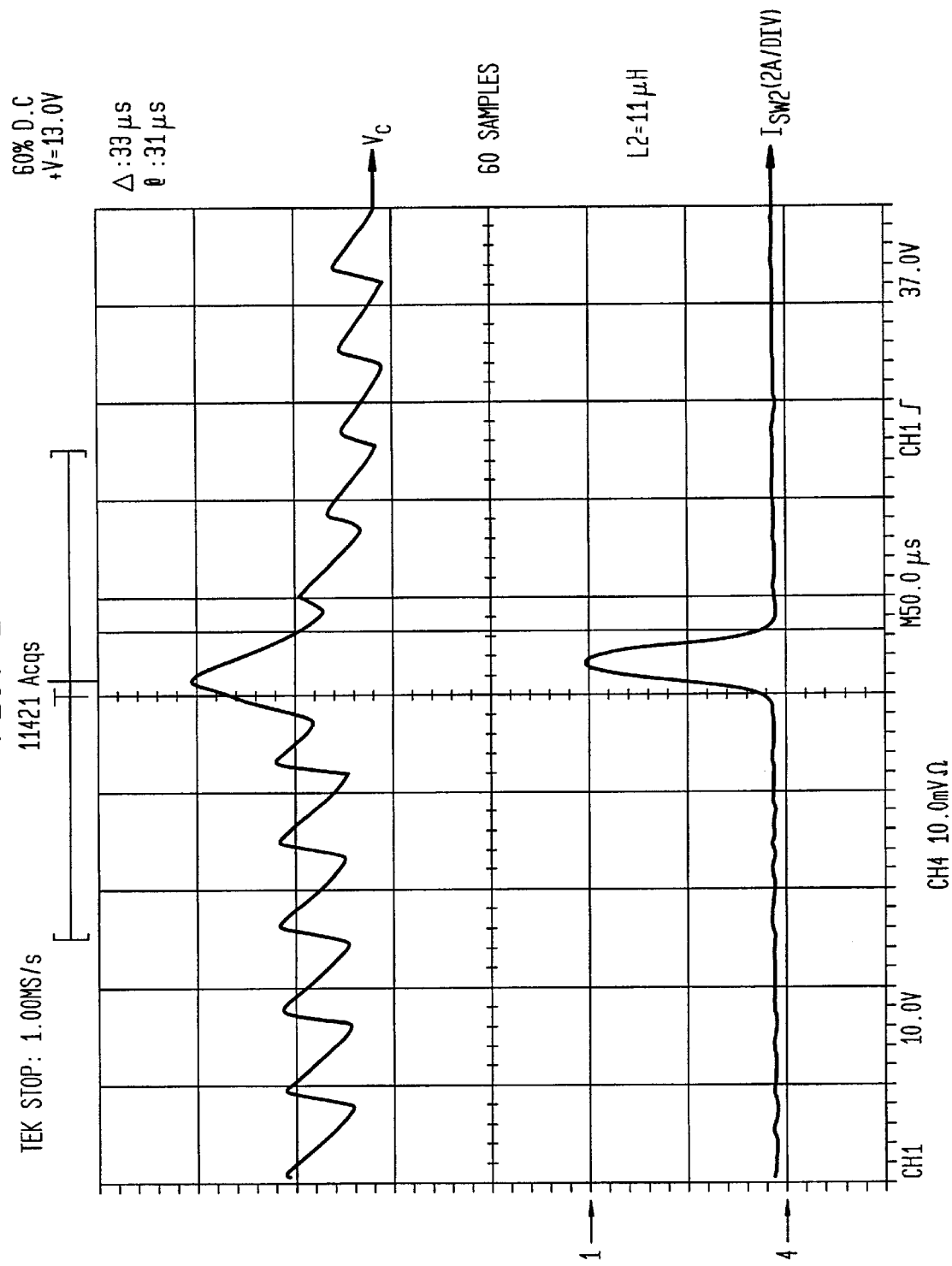

FIG. 14 illustrates one embodiment of the active snubbing circuit. The active switch control or driver of the circuit is comprised of U1A 34, R1 36, R2 38, R3 40, and C3 42, commonly known as a "push-pull" driver. The circuit is comprised of a comparator which senses the capacitor voltage and compares it to a set voltage reference. The reference level is supplied by a Σ to α converter based on the motor speed from a microcontroller. (A Σ to α converter converts a sum of pulse width modulated pulses of constant frequency to a voltage difference.) For tesfing purposes, the reference level is supplied by a potentiometer. FIG. 15 illustrates the output of the triggering circuit used to control the active snubber switch. The circuit reacts very quickly to any voltage peaks present across the snubber capacitor.

SNUBBER BEHAVIOR USING ZENER DIODE

To test the behavior of the active snubber, $S_2$ was first simulated using a Zener diode. Therefore, the entire active snubber circuit was simulated using a Zener diode in series with an inductor. The Zener voltage was selected to be equal to +22 volts (V). As the anode of the Zener diode was connected to the positive rail, the Zener diode conducted at a voltage equal to the supply rail plus the Zener voltage. At a battery voltage of +13 V, the Zener diode started to conduct at +35 V. In this case, triggering circuitry was not needed, as the Zener diode acted as its own trigger. In the final circuit configuration, a Zener diode is not the preferred solution for the active snubber, as the device behavior may lead to higher losses.

FIGS. 16 to 19 illustrate the current through the Zener diode once the threshold voltage was exceeded. The magnitude and width of the peak current values varied as the active snubber's inductance value varied. With no inductor (L=0 μH, FIG. 16), the current and di/dt through the Zener diode was very high. Consequently, there were many high frequency harmonics generated without an inductor. As inductance was added (L=1.7 μH, FIG. 17, L=6.3 μH, FIG. 18, L=11 μH, FIG. 19) the peak current through the Zener diode decreased, and the base widened. The shape of the Zener diode current was sinusoidal. The difference between the simulated and actual results is the absence of a sharp turn off edge in the Zener diode current once the capacitor voltage had fallen to the desired level. This was the result of turn off behavior of the Zener diode as opposed to that of a controlled switch.

The frequency of the current through the Zener diode should also be noted. From FIG. 19, one half cycle of the zener diode current is 33 μs. The entire period, therefore was equal to 66 μs. This corresponded to a frequency of 15.151 kHz, or 95,199 rads s$^{-1}$. The theoretical frequency for the current through the Zener diode should have been $1/\sqrt{LC}=1/\sqrt{11 \mu H (9 \mu F)}$ which is equal to 100,503 rads s$^{-1}$, or 15995.7 Hz. This represents an error between predicted and theoretical results of 5%, which may be attributed to stray inductances, stray capacitances, and variations in component values from the ideal.

SNUBBER BEHAVIOR USING MOSFET

Referring to FIG. 14, the active snubber circuitry comprises components including U2A 44, C2 46, D1 47, D2 48, D3 53, Q1 50, and L1 52. Components D1 47 and C2 46 act as a voltage doubler ensuring Q1, a MOSFET, 50 will be turned on since the MOSFET source is referenced to the positive voltage rail. D2 48 acts as a voltage clamp ensuring the gate to source voltage of the MOSFET never exceeds +25 V, which would cause a MOSFET failure. The gate drive for the MOSFET is supplied by the voltage doubler. "Freewheeling" diode D3 53 is present to allow freewheeling current in the snubber inductor L1 52 to flow when it has been turned off. If the inductance in the snubber inductor L1 52 is very small, then freewheeling diode D3 53 is not necessary.

Figure 20:
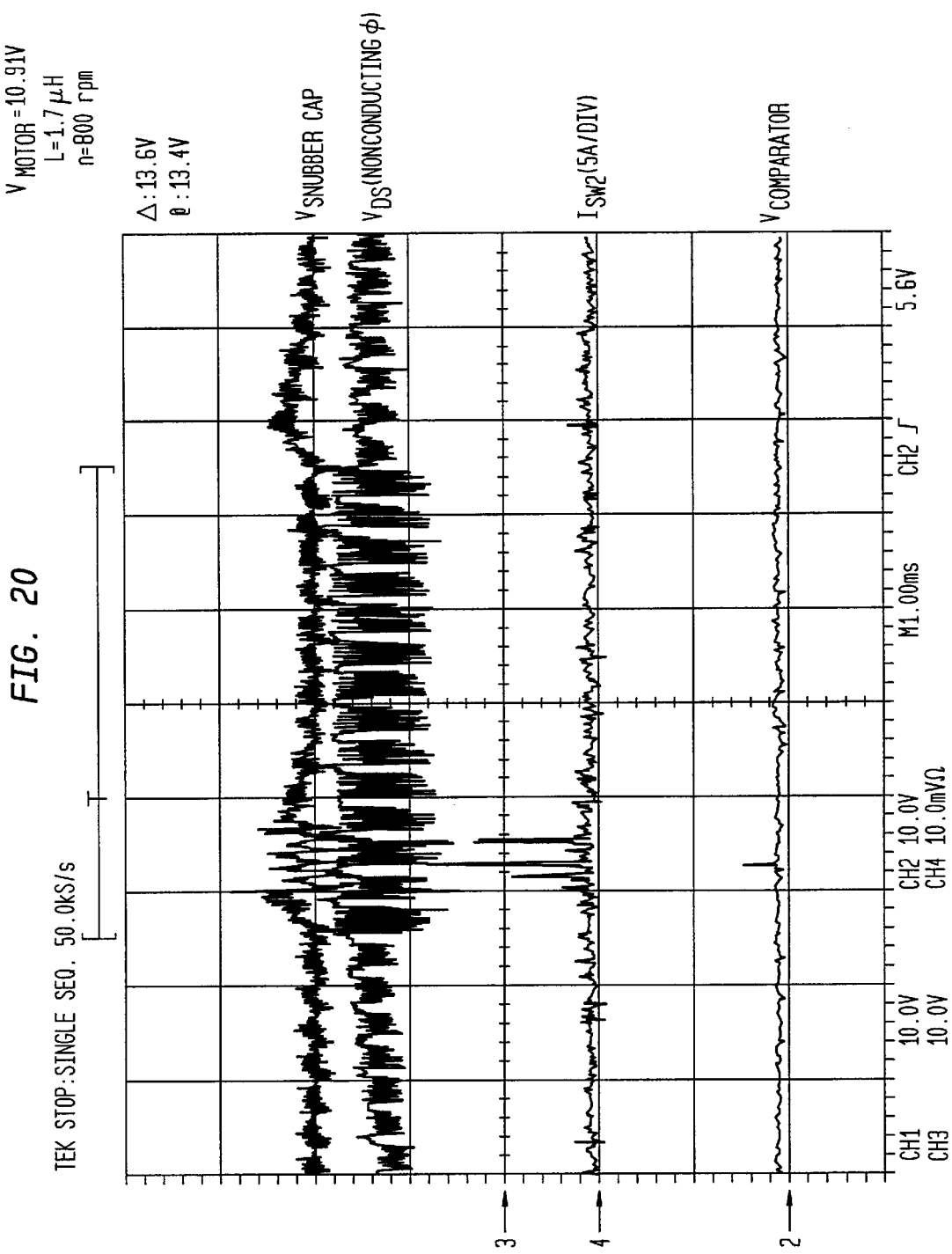
FIGS. 20 to 22 are plots of the behavior of the active snubbing circuit shown in FIG. 14.
Figure 21:
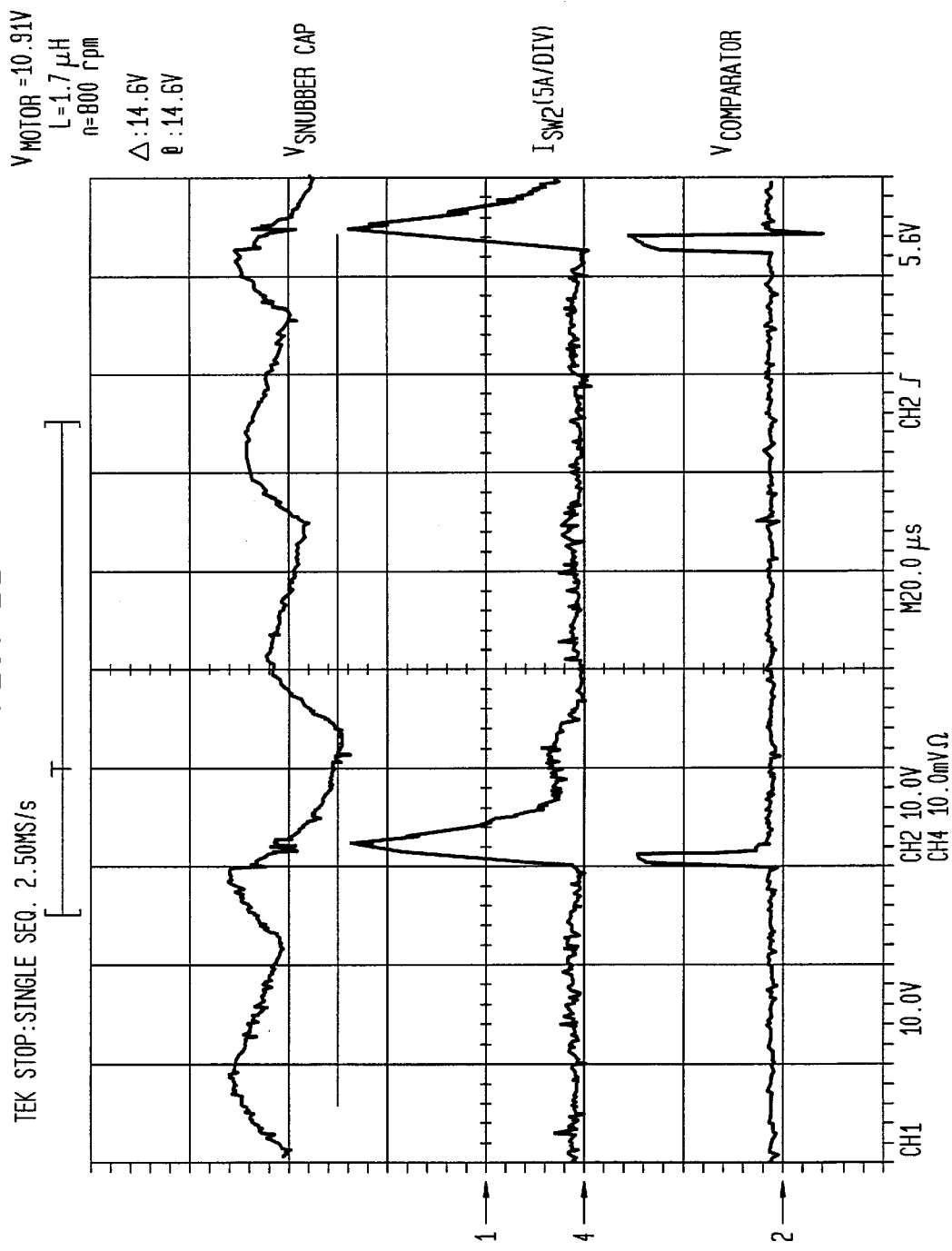
Figure 22:
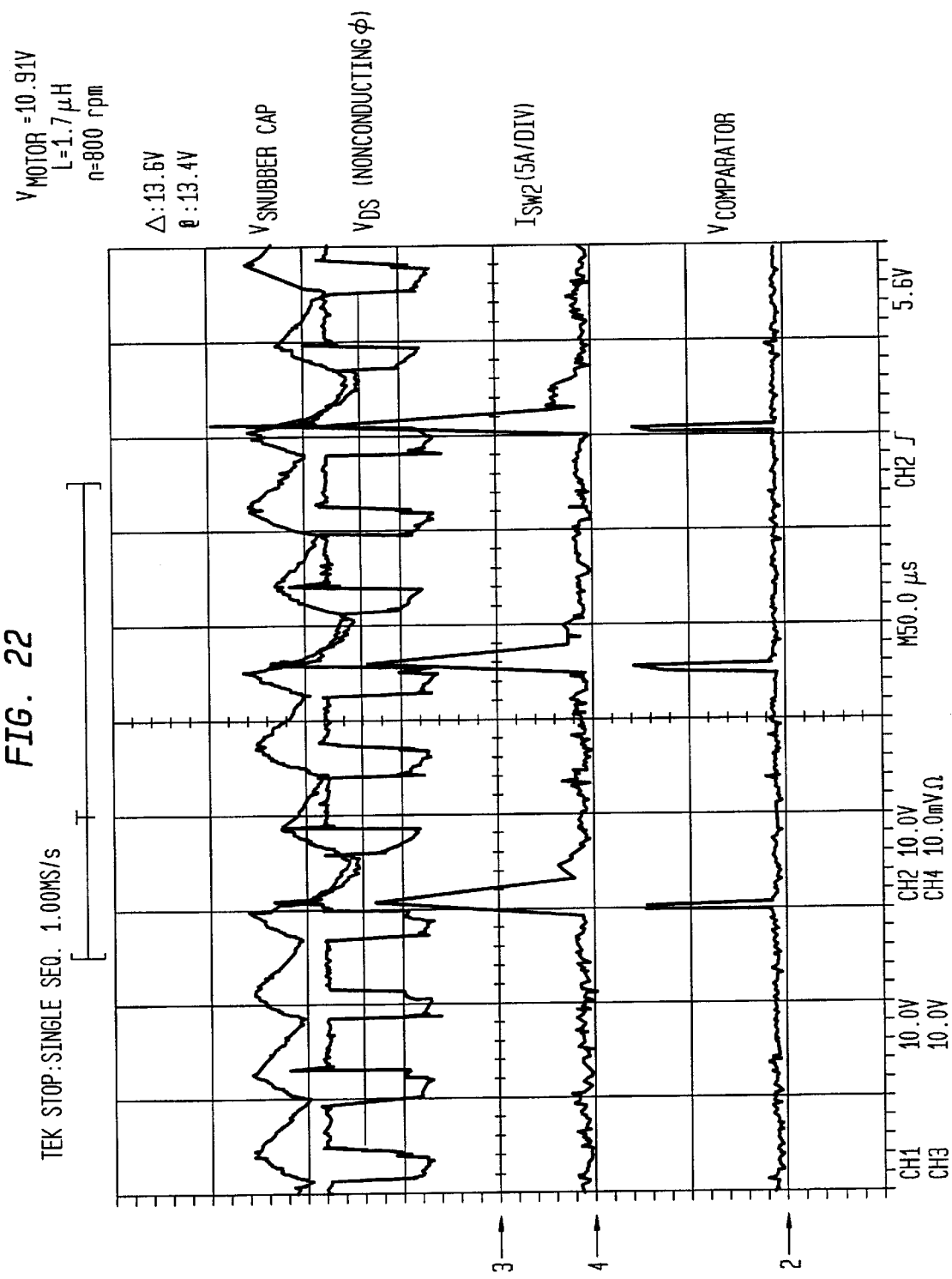

FIGS. 20 to 22 illustrate the behavior of the active snubbing circuit. In FIG. 20, we see the effects of the active snubber triggering on the snubber capacitor voltage and the current through S$_2$. When the snubber capacitor voltage is increased, S$_2$ conducted resulting in a current flowing through it. The snubber capacitor voltage was effectively clamped to the desired reference level. From FIG. 21, we see that the current through S$_2$ increased very rapidly with a 1.7 μH inductance. The current in S$_2$ rose to 12 amperes (A) in a matter of 4 microseconds (μs). The corresponding rise in current through S$_2$ also resulted in a rapid fall in the snubber capacitor voltage. From FIG. 22, we see that a fall in the snubber capacitor voltage resulted in conduction of the motor back EMF. This supplied the motor braking torque, and there was a slight increase in motor current and drop in efficiency. This problem may be overcome by increasing the value of the inductance in series with S$_2$. This will decrease the current through S$_2$, and also slow down the discharge of the snubber capacitor. At all speeds, the snubber capacitor voltage must be greater than the back EMF of the nonconducting phases.

Figure 23:
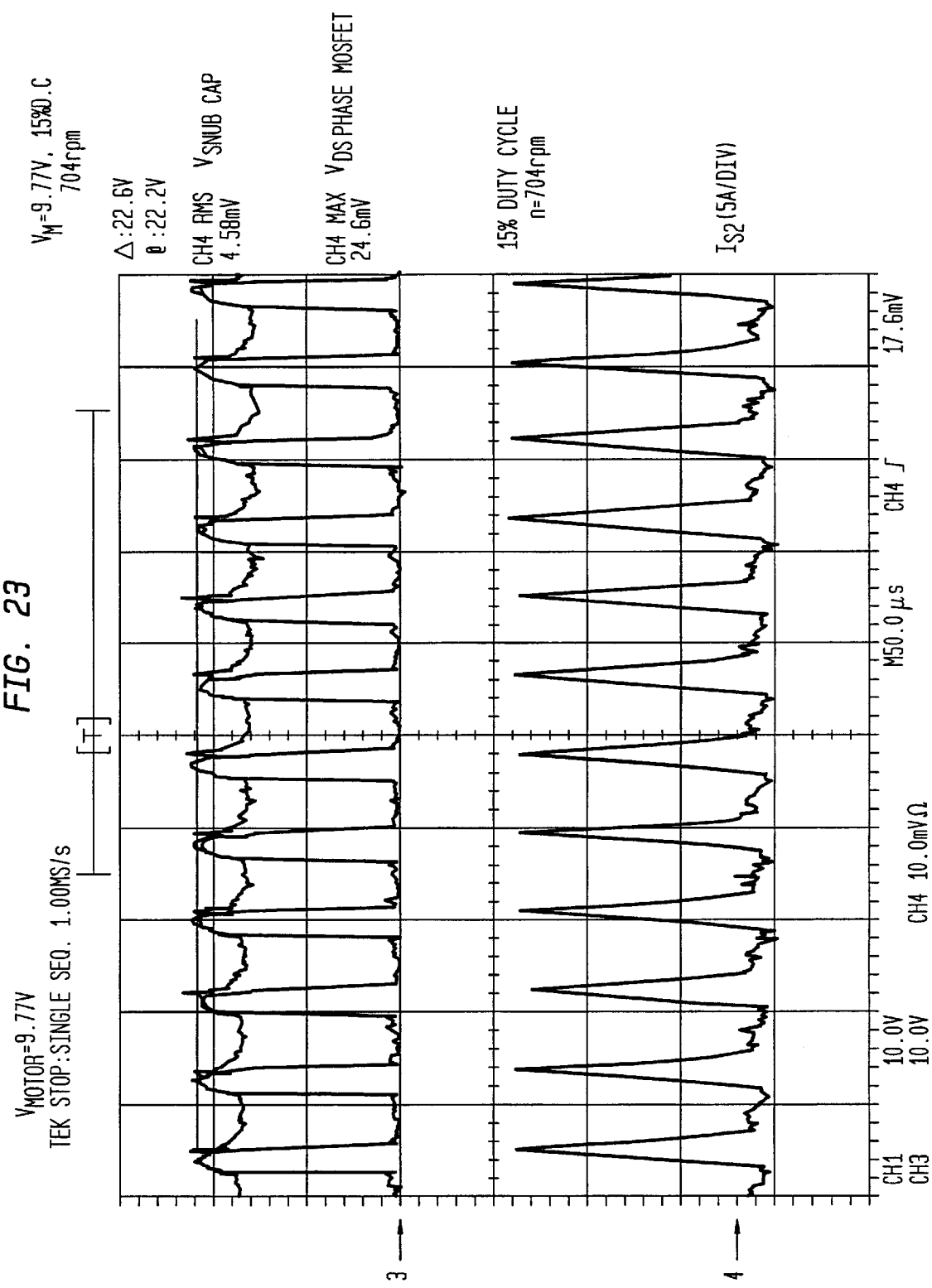
FIGS. 23 to 27 are plots showing active snubber operation at low, medium, and high motor speeds.

A comparison of the active snubber operation at low, medium, and high motor speeds may be found in FIGS. 23 through 27. FIG. 23 illustrates the operation of the snubber at a pulse width modulated (PWM) input duty cycle of 15%. It may be seen that the active snubber effectively clamped the snubber capacitor voltage to 22.6 volts. The peak current through S$_2$ was approximately 15 A. However, the switch itself, which is shown as a MOSFET 50 in FIG. 14, has an R$_{ds\ on}$ value (the minimum drain to source resistance when the MOSFET is conducting completely) equal to. 10 mΩ. The worst case power, the instantaneous power through the switch, therefore, is equal to:

$$P_{dS2} = I^2 R \text{ (W)}$$
$$= 15^2 (0.01)$$
$$= 2.25 \text{ W}$$

This is much lower than the estimated 40 W which must be dissipated by the snubber resistor in the present snubber configuration.

Figure 24:
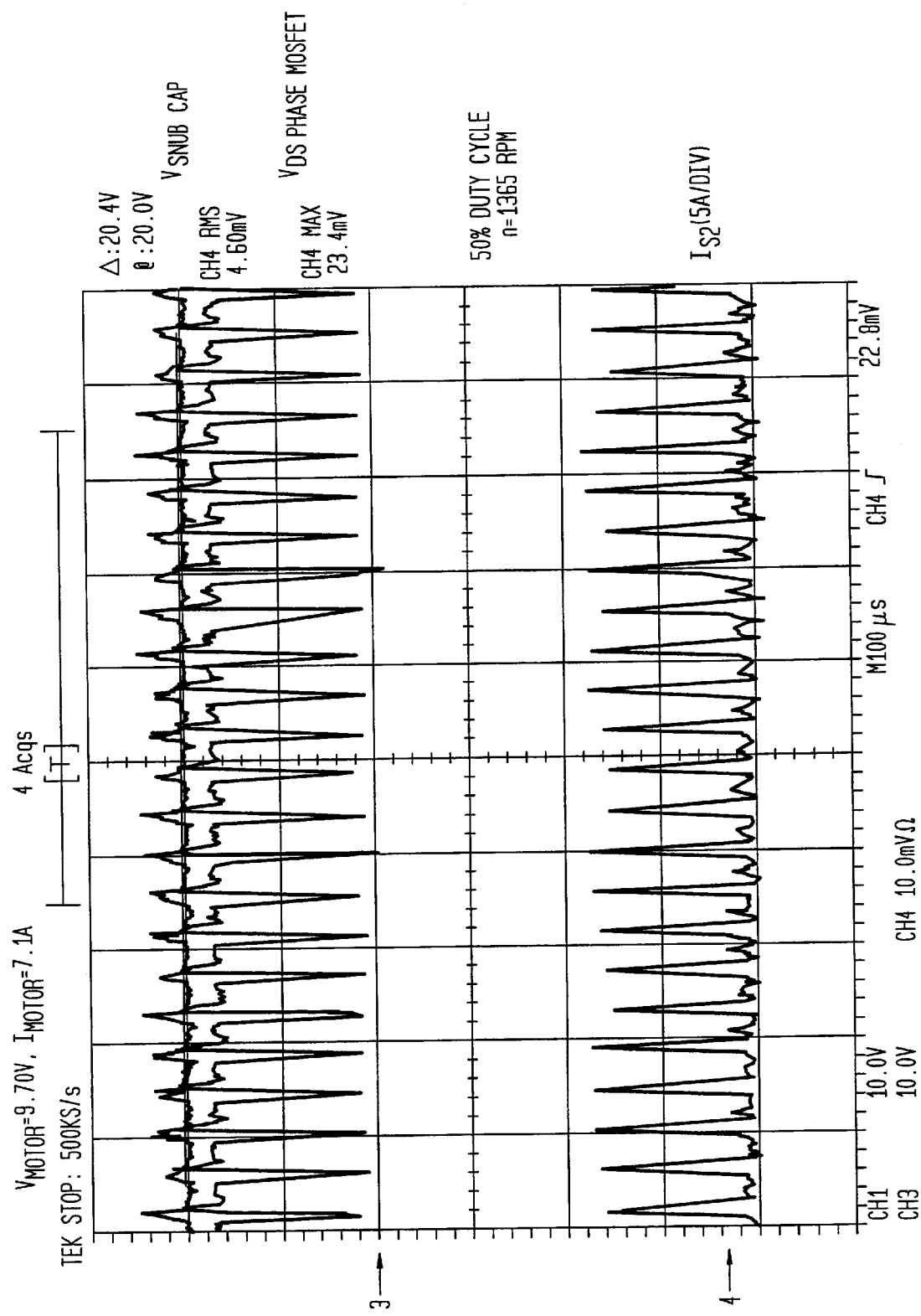

As the motor increases in speed, the power which S$_2$ must dissipate becomes lower. This is illustrated in FIG. 24. At an intermediate speed of 1365 rpm using a desired speed of 50% maximum speed, the peak instantaneous current through the device is equal to 9 A. This corresponds to a worst case instantaneous power through the switch equal to 0.81 W.

Figure 25:
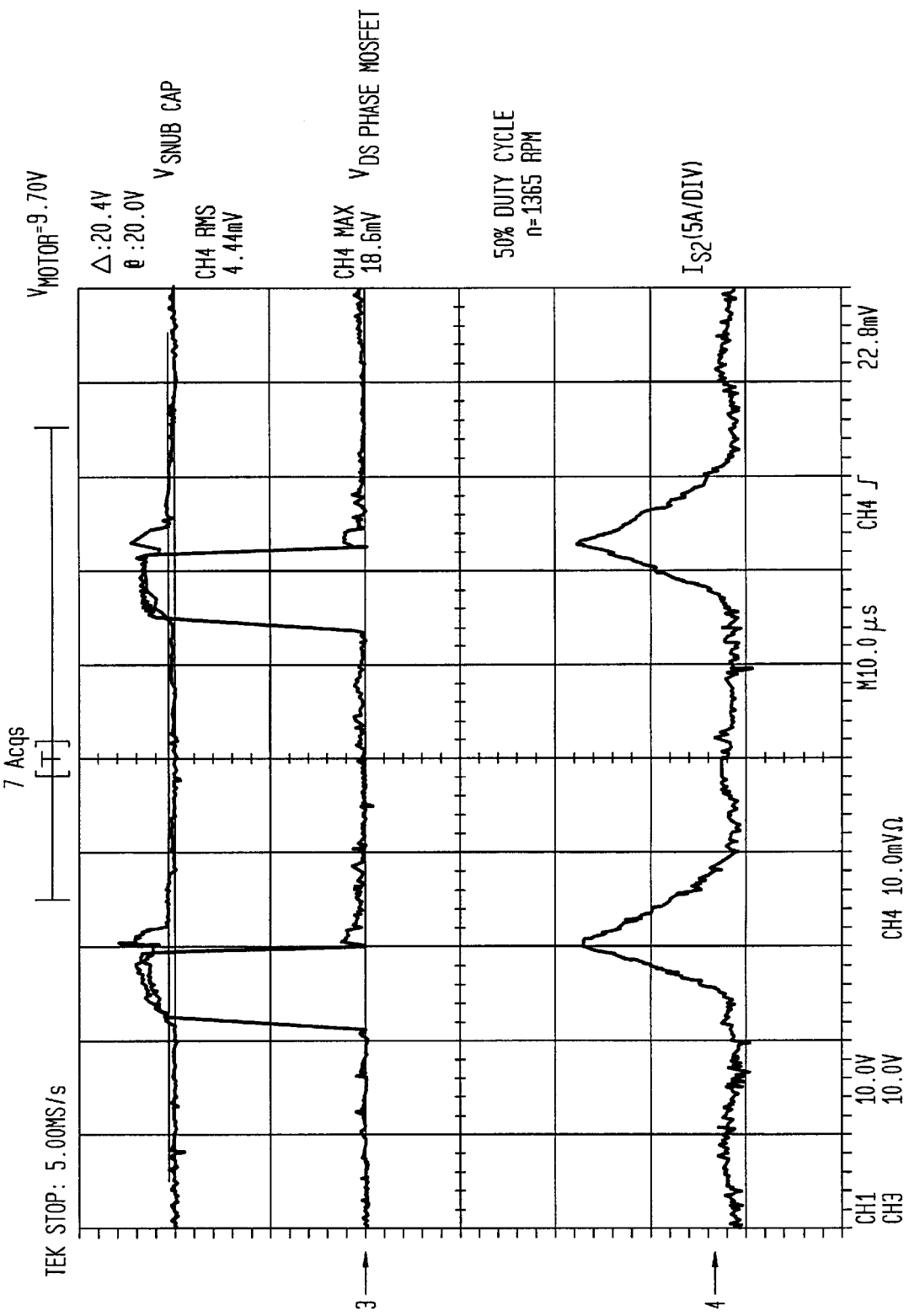

FIG. 25 shows the behavior of the snubber circuit over two chopping cycles. It may be seen that the current through S$_2$ is not instantaneous. Therefore, the snubber capacitor is not discharged instantaneously when S$_2$ starts to conduct. Consequently, energy may be removed from the snubber capacitor and the snubber capacitor voltage may be maintained at the desired levels.

Figure 26:
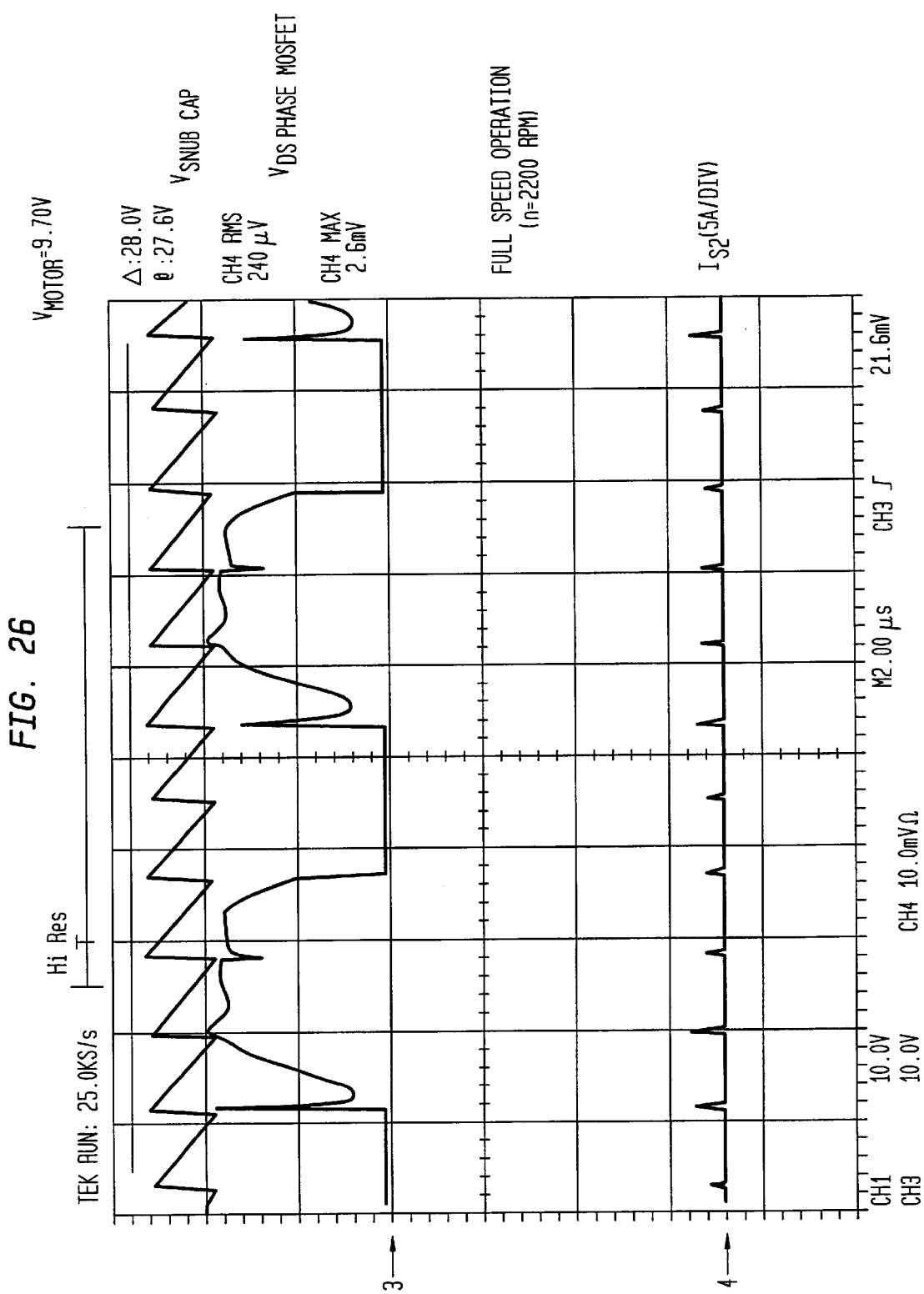
Figure 27:
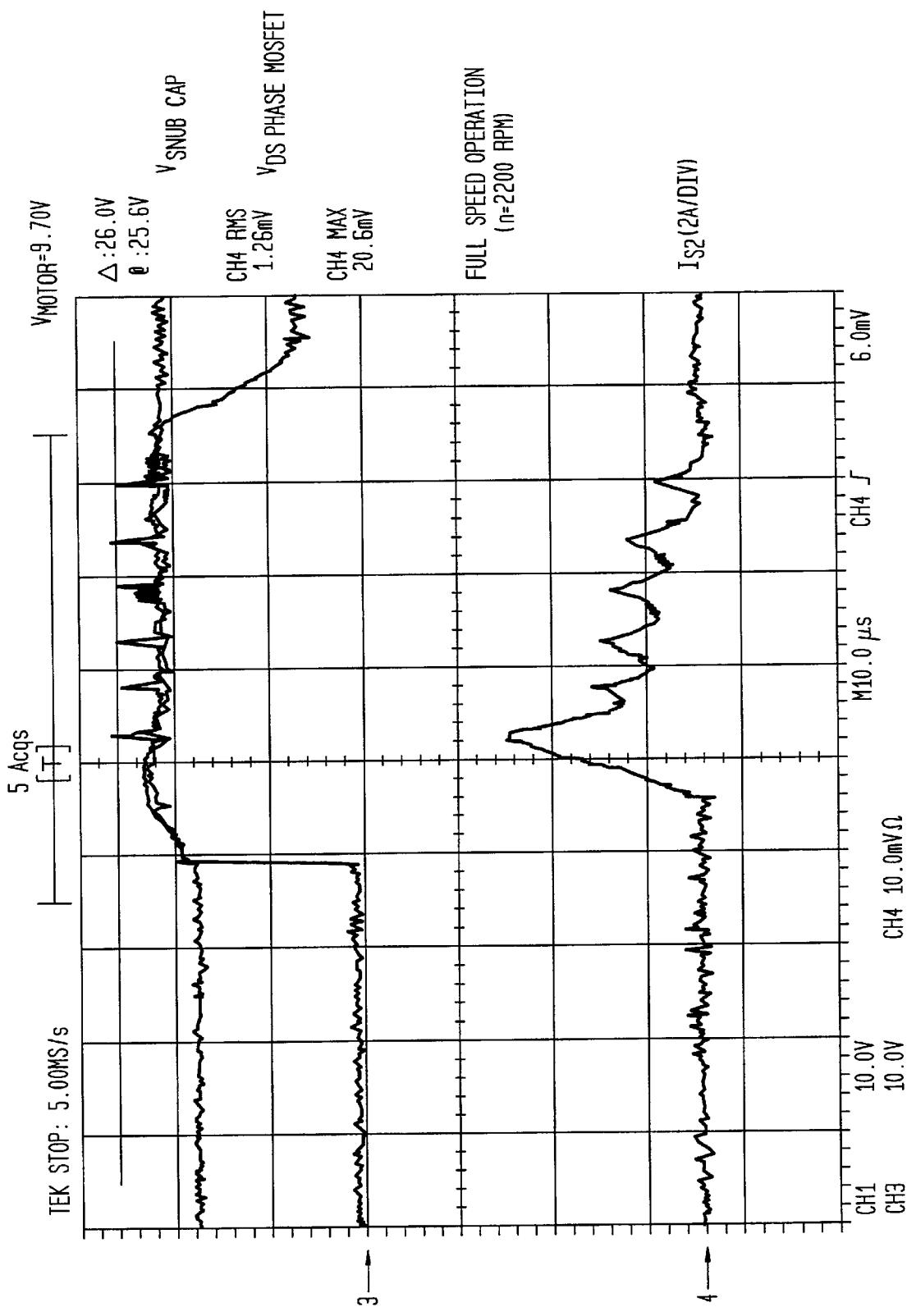

FIGS. 26 and 27 show the full speed operation of the snubber. In the present snubber configuration, the snubber resistor conducts the phase back EMF through it even when there is no chopping. This situation is not desired as it leads to the application of braking torque. This leads to an overall loss of high speed efficiency.

In FIG. 26, it may be seen that S$_2$ conducts only when the coil discharges at the end of its conduction period. This allows the snubber voltage to be maintained at levels greater than the back EMF and prevents conduction of the back EMF through the snubber network, which results in a higher overall motor efficiency.

FIG. 27 shows the action of the active snubber when the phase coil turns off. The scope trace is an expansion in the area of the turn off peak for one phase coil. As may be seen, as the voltage across the phase MOSFET increases, S$_2$ will start to close as soon as the MOSFET drain to source voltage exceeds the reference level. As the coil discharges into the snubber capacitor, the phase MOSFET drain to source voltage will be maintained by repeatedly turning on S$_2$. At high speed it may be seen that the current S$_2$ must conduct is very small, due to the absence of PWM chopping.

Figure 28A:
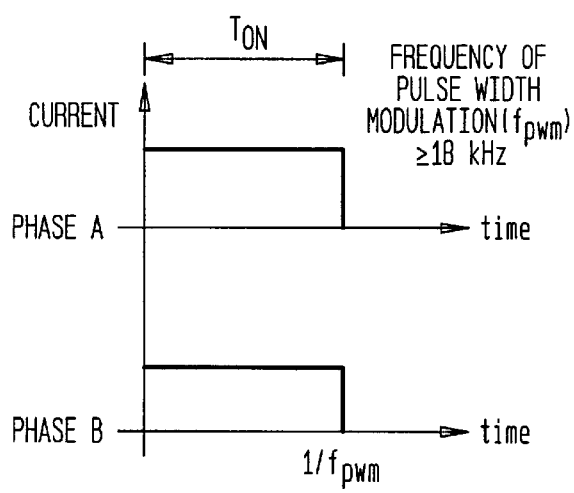
FIG. 28a shows a graph of the magnitude of the current of the two active phases of a motor plotted against time, the phase currents.having simultaneous turn on and turn off times.
Figure 28B:
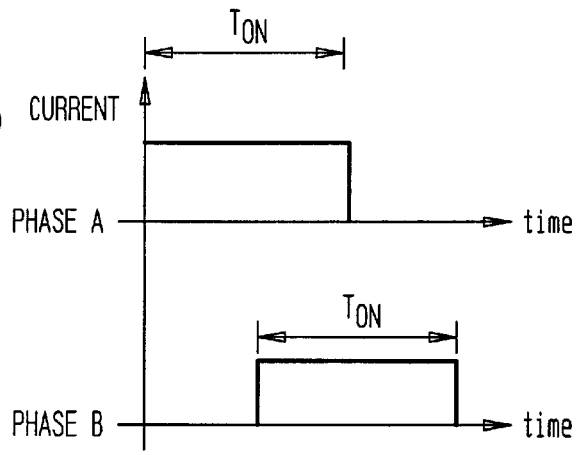
FIG. 28b shows a graph of the magnitude of the current of the two active phases of a motor plotted against time, the phase currents having staggered turn on and turn off times.

In the case of controlling a four or five phase motor or in any motor where two phases are on at any given time and subject to PWM, the frequency of the pulses produced being at least 18 kilohertz, the turn on and turn off times of the currents of the two active phases A and B, see FIG. 28a, in conventional motors occur simultaneously. This leads the energy in the phase coils for the active phases A and B to be dumped into the snubber network simultaneously. This energy can be reduced by one-half if the active phase turn on and turn off times are staggered as shown in FIG. 28b. In such a case, the reduced energy to which the active snubber components will be subjected will lead to lower radio frequency interference (RFI) emissions and thermal dissipation, thus increasing reliability.

Figure 29A:
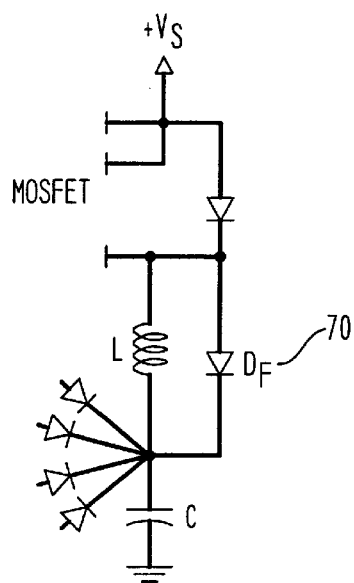
FIG. 29a is a schematic diagram showing a first alternative arrangement of the snubber circuit enclosed by the rectangular dotted line box.
Figure 29B:
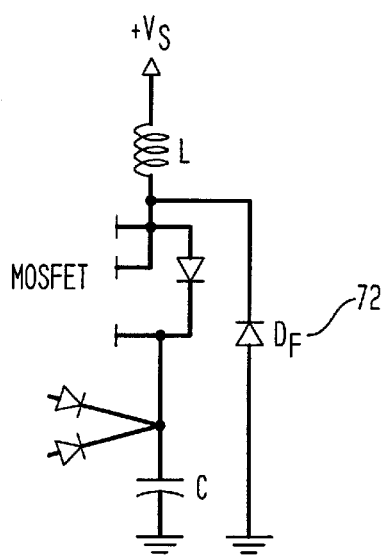
FIG. 29b is a schematic diagram showing a second alternative arrangement of the snubber circuit enclosed.by the rectangular dotted line box in FIG. 29.
Figure 29:
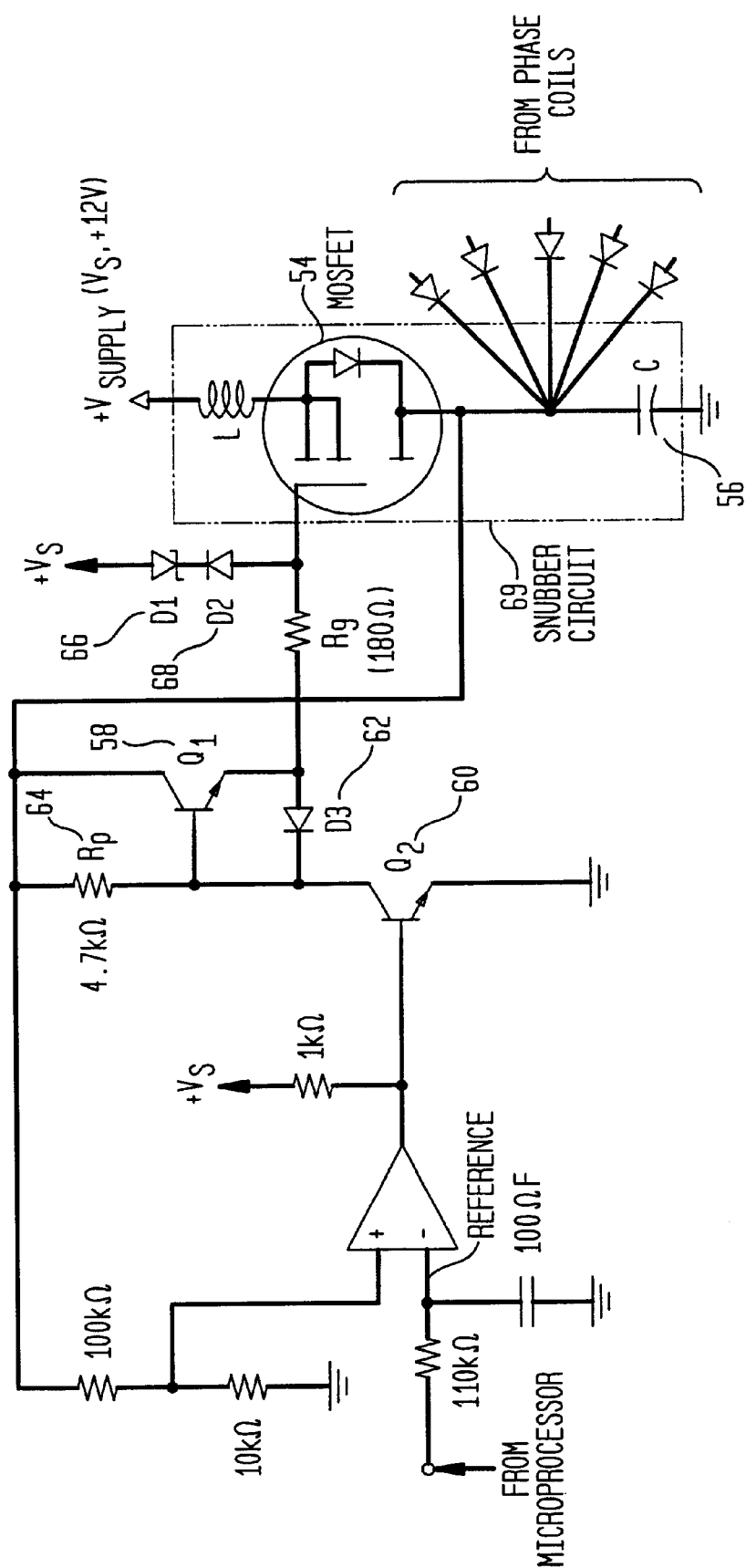
FIG. 29 is a schematic diagram of an alternative configuration of the active snubbing circuit with respect to that shown in FIG. 14.

FIG. 29 shows an alternative embodiment of the active snubbing circuit shown in FIG. 14. The gate drive for the snubber MOSFET 54 is supplied by the snubber capacitor 56. The driver circuit for the snubber MOSFET 54 is comprised of Q1 58, Q2 60, D3 62, and $R_p$ 64 and is known as a standard "totem pole" MOSFET driver (inverting type). D1 66 and D2 68 protect the MOSFET 54 gate from overvoltage. Alternate embodiments of the snubber circuit 69 appear in FIGS. 29a and 29b. In these embodiments as in FIG. 14 and for the same purpose as previously explained, a freewheeling diode $D_F$ 70, 72 has been added to the snubber circuit. Finally, it should be noted that, although FIGS. 14, 29, 29a, and 29b show the snubber capacitor connected to ground, it could also be connected to the positive voltage rail, $V_s$.

CONCLUSION

From theoretical modeling and experimental results, it may be seen that the active snubber is a practical alternative to the snubber resistor. Furthermore, it has been shown that the active snubber functions according to the theoretical model. Consequently, this solution is an attractive solution for higher power unipolar motor applications where components for a conventional RCD snubber would be very large due to the current being switched.

An increase in motor efficiency may be realized using this solution, as the MOSFET drain to source voltage can be accurately controlled so as to prevent conduction of the phase back EMFs through the snubber network.

If the active snubber is based on a resonant return of energy to the positive voltage rail, EMI harmonics associated with the return of energy to the positive rail when using a conventional RCD snubber may be minimized.

What is claimed is:

1. An actively controlled regenerative snubber configuration for use in a unipolar brushless direct current motor having a voltage supply with a positive terminal and a negative terminal, said snubber configuration including a snubber circuit separate from and connected to said motor, said snubber circuit comprising:
    a) a first inductor;
    b) a first switch; and
    c) a capacitor;
said first inductor, said first switch and said capacitor being connected in a series circuit having first and second ends, where said first end is directly connected to said positive terminal and said second end is directly connected to said negative terminal.

2. An actively controlled regenerative snubber configuration in accordance with claim 1, wherein said first inductor, said first switch and said capacitor are connected to said positive terminal in parallel with at least one second inductor and at least one second switch, and wherein said snubber circuit is connected to a bottom of each of said at least one second inductor through a diode.

3. An actively controlled regenerative snubber configuration in accordance with claim 1, wherein voltage across said capacitor is maintained slightly higher in magnitude than back electromotive force voltage for said motor at a particular motor speed.

4. An actively controlled regenerative snubber configuration in accordance with claim 1, wherein said first inductor, said first switch and said capacitor are connected to said positive terminal in parallel with at least one second inductor and at least one second switch, and wherein said capacitor discharges through said first inductor once voltage of said capacitor reaches a certain value, said discharge of said capacitor returning energy stored in said at least one second inductor to said positive terminal, said discharge of said capacitor through said first inductor minimizing high frequency discharge current conducted and radiated noise emissions.

5. An actively controlled regenerative snubber configuration in accordance with claim 1, wherein said first switch is a metal oxide semiconductor field effect transistor (MOSFET).

6. An actively controlled regenerative snubber configuration in accordance with claim 5, further comprising a gate drive for said MOSFET comprising a voltage doubler.

7. An actively controlled regenerative snubber configuration in accordance with claim 5 further comprising a gate drive for said MOSFET comprising said capacitor.

8. An actively controlled regenerative snubber configuration in accordance with claim 5 further comprising a push-pull driver circuit for said MOSFET.

9. An actively controlled regenerative snubber configuration in accordance with claim 5 further comprising a totem pole driver circuit for said MOSFET.

10. An actively controlled regenerative snubber configuration in accordance with claim 5 further comprising at least one diode to protect said MOSFET from overvoltage.

11. An actively controlled regenerative snubber configuration in accordance with claim 1 further comprising a grounded diode connected to said snubber circuit between said first inductor and said capacitor.

12. An actively controlled regenerative snubber configuration in accordance with claim 1, wherein said capacitor is directly connected to ground.

13. An actively controlled regenerative snubber configuration in accordance with claim 1, wherein said capacitor is directly connected to said positive terminal.

14. An actively controlled regenerative snubber configuration for use in a unipolar brushless direct current motor having a voltage supply with a positive terminal and a negative terminal, said snubber configuration comprising at least two snubber circuits separate from and connected to said motor, each of said at least two snubber circuits comprising:
    a) a first inductor;
    b) a first switch; and
    c) a capacitor;
    said first inductor, said first switch and said capacitor being connected in a series circuit having first and second ends, where said first end is directly connected to said positive terminal and said second end is directly connected to said negative terminal.

15. An actively controlled regenerative snubber configuration in accordance with claim 14, wherein in each of said at least two snubber circuits said first inductor, said first switch and said capacitor are connected to said positive terminal in parallel with at least one second inductor and at least one second switch, and wherein each of said at least two snubber circuits is connected to a bottom of each of said at least one second inductor through a diode.

16. An actively controlled regenerative snubber configuration in accordance with claim 14, wherein voltage across said capacitor is maintained slightly higher in magnitude than back electromotive force voltage for said motor at a particular motor speed.

17. An actively controlled regenerative snubber configuration in accordance with claim 14, wherein in each of said at least two snubber circuits said first inductor, said first switch and said capacitor are connected to said positive terminal in parallel with at least one second inductor and at least one second switch, and wherein said capacitor discharges through said first inductor once voltage of said capacitor reaches a certain value, said discharge of said capacitor returning energy stored in said at least one second inductor to said positive voltage supply, said discharge of said capacitor through said first inductor minimizing high frequency discharge current conducted and radiated noise emissions.

18. An actively controlled regenerative snubber configuration in accordance with claim 14, wherein said first switch is a metal oxide semiconductor field effect transistor (MOSFET).

19. An actively controlled regenerative snubber configuration in accordance with claim 18 further comprising a gate drive for said MOSFET comprising a voltage doubler.

20. An actively controlled regenerative snubber configuration in accordance with claim 18 further comprising a gate drive for said MOSFET comprising said capacitor.

21. An actively controlled regenerative snubber configuration in accordance with claim 18 further comprising a push-pull driver circuit for said MOSFET.

22. An actively controlled regenerative snubber configuration in accordance with claim 18 further comprising a totem pole driver circuit for said MOSFET.

23. An actively controlled regenerative snubber configuration in accordance with claim 18 further comprising at least one diode to protect said MOSFET from overvoltage.

24. An actively controlled regenerative snubber configuration in accordance with claim 14 further comprising at least one grounded diode, one of said at least one grounded diode being connected to each of said at least one snubber circuit between said first inductor and said capacitor.

25. An actively controlled regenerative snubber configuration in accordance with claim 14, wherein said capacitor is directly connected to ground.

26. An actively controlled regenerative snubber configuration in accordance with claim 14, wherein said capacitor is directly connected to said positive terminal.

* * * * *